United States Patent
Ishii et al.

(10) Patent No.: US 7,715,054 B2
(45) Date of Patent: May 11, 2010

(54) IMAGE PROCESSING APPARATUS, IMAGE PROCESSING METHOD AND IMAGE FORMING APPARATUS

(75) Inventors: Akira Ishii, Kanagawa (JP); Toru Misaizu, Kanagawa (JP); Yoshifumi Takebe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 800 days.

(21) Appl. No.: 11/589,133

(22) Filed: Oct. 30, 2006

(65) Prior Publication Data

US 2007/0195372 A1    Aug. 23, 2007

(30) Foreign Application Priority Data

Feb. 22, 2006    (JP) .......................... P.2006-045957

(51) Int. Cl.
*G06K 15/00*    (2006.01)
(52) U.S. Cl. ...................... 358/3.06; 358/3.13; 358/3.2
(58) Field of Classification Search ................ 358/534, 358/535, 536, 3.13, 3.16, 3.17, 3.2, 3.06
See application file for complete search history.

(56) References Cited

U.S. PATENT DOCUMENTS

| 5,646,670 A | 7/1997 | Seto et al. |
| 5,691,828 A * | 11/1997 | Weiss et al. ................. 358/534 |
| 5,940,657 A | 8/1999 | Yokomori et al. |
| 6,731,405 B2 * | 5/2004 | Samworth .................. 358/3.06 |
| 2006/0256385 A1 | 11/2006 | Takebe et al. |
| 2006/0290731 A1 | 12/2006 | Ishii et al. |

FOREIGN PATENT DOCUMENTS

| CN | 1122883 C | 10/2003 |
| JP | 3347411 | 9/2002 |
| JP | 2005-26987 | 1/2005 |

* cited by examiner

*Primary Examiner*—Thomas D Lee
(74) *Attorney, Agent, or Firm*—Morgan, Lewis & Bockius LLP

(57) ABSTRACT

An image processing apparatus includes an input section and a binarizing section. The input section inputs multilevel image data. The binarizing section binarizes multilevel image data to generate output image data representing halftone dots each having a hollow-structure. The binarizing section enlarges the halftone dots in a predetermined direction preferentially in accordance with the input multilevel image data.

16 Claims, 18 Drawing Sheets

HALFTONE-DOT IMAGE ACCORDING TO THIS EXEMPLARY EMBODIMENT

C3 ←——— INTERMEDIATE DENSITY RANGE ———→ C4

HALFTONE-DOT IMAGE ACCORDING TO RELATED ART

OUTLINE OF BINARIZATION PROCESS ACCORDING TO RELATED ART

EXAMPLE OF HALFTONE-DOT IMAGE: HALFTON-DOT SCREEN OF 190 LINES/18 DEGREES

IMAGE PROCESSING APPARATUS, IMAGE PROCESSING METHOD AND IMAGE FORMING APPARATUS

BACKGROUND

1. Technical Field

The invention relates to an image processing apparatus for converting multilevel image information into binary image information when an image is formed.

2. Description of the Related Art

Generally, an image forming apparatus, such as a copying machine or a printer, using an electrophotographic system or an ink-jet technique, performs image processing for representing halftones by converting input multilevel image data into binary image data. As an image processing method for converting multilevel image data into binary image data, there is known a binarizing process (halftone-dot processing) for forming halftone dots (colored dots) having size corresponding to the input multilevel image data so that the density of a halftone image is reproduced apparently by the size of the colored dots.

For example, a color image forming apparatus for forming a color image by an electrophotographic system, prints and superposes respective toner images of the four colors of yellow (Y), magenta (M), cyan (C) and black (K) successively on a sheet of paper, which serves as a recording medium, to thereby form a color image. On this occasion, the density of each color toner image is reproduced as a set of a large number of fine halftone dots by use of the aforementioned binarizing process.

The binarizing process according to the related art will be described specifically while a color copying machine using an electrophotographic system is taken as an example. FIG. 13A is a view schematically showing an example of the binarizing process according to the related art. FIG. 13B is a view showing an example of halftone dots (halftone-dot image) generated by the binarizing process. As shown in FIG. 13A, to form an image of a color original, the image density in the color original is first detected in units of pixels each having a predetermined size, so as to generate multilevel data having a predetermined number of bits for representing the image density (density level "8" in 16 gradations of 4 bits is shown as an example in FIG. 13A) as an input image signal. Then, a comparator compares the input image signal (multilevel data) with predetermined screen pattern data (respective threshold data in a threshold matrix). Thus, multilevel data of each pixel in the color original is binarized to thereby generate a binarized recording signal.

The generated binarized recording signal is output to an exposure device. The exposure device controls the on/off state of an exposure beam (such as a laser beam) on the basis of the binarized recording signal so as to scan and exposes an image carrier (such as a photoconductor drum) with and to the exposure beam. Thus, an electrostatic latent image in accordance with the on/off state of the exposure beam is formed on the image carrier. The electrostatic latent image is developed with each color toner. In this manner, respective color toner images are formed. The respective color toner images are transferred and fixed onto a sheet of paper, so that a color image is formed. On this occasion, the image density of the color image on the sheet of paper is represented by halftone dots each having a size corresponding to the image density as shown in FIG. 13B.

SUMMARY

According to an aspect of the invention, an image processing apparatus includes an input section and a binarizing section. The input section inputs multilevel image data. The binarizing section binarizes multilevel image data to generate output image data representing halftone dots each having a hollow-structure. The binarizing section enlarges the halftone dots in a predetermined direction preferentially in accordance with the input multilevel image data.

The term "hollow structure" includes the case where pixel dots having lower density than a contour portion of the halftone dot are formed inside the contour portion, the case where no pixel dot is formed inside the contour portion of the halftone dot, and the case where at least one non-pixel dot (non-output dot) is formed inside an aggregation of pixel dots (output dots) of the halftone dot. This rule applies hereunder.

DETAILED DESCRIPTION

Exemplary embodiments of the invention will be described below in detail with reference to accompanying drawings.

First Exemplary Embodiment

Figure 1:
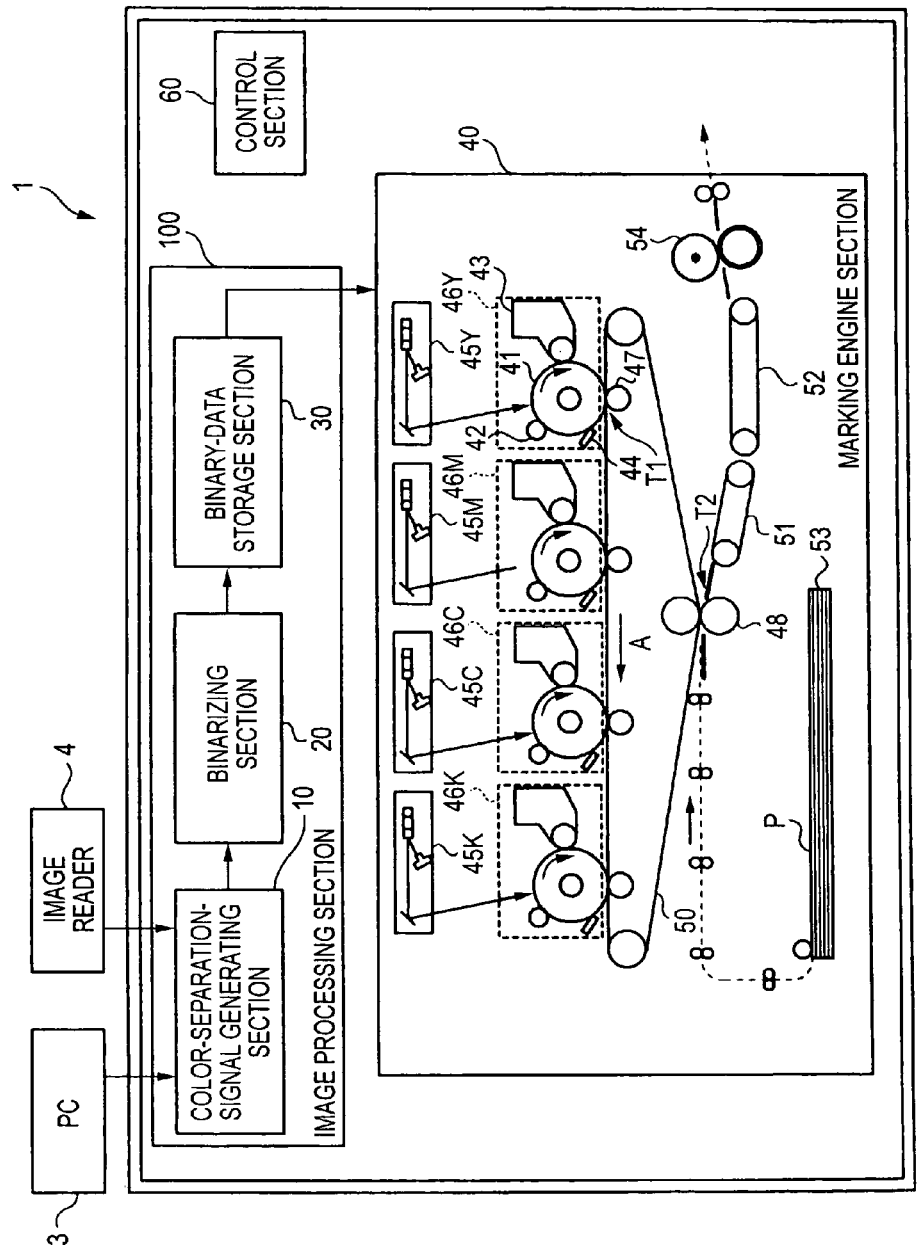
FIG. 1 is a diagram showing an overall configuration of an image forming apparatus according to a first exemplary embodiment of the invention.

FIG. 1 is a diagram showing the overall configuration of an image forming apparatus 1 according to a first exemplary embodiment. The image forming apparatus 1 shown in FIG. 1 includes a color-separation-signal generating section 10, a binarizing section 20, a binary-data storage section 30, a marking engine section 40 and a control section 60. The color-separation-signal generating section 10 is an example of an input section for inputting image data. The color-separation-signal generating section 10 performs image processing such as mapping on the input image data. The binarizing section 20 converts multilevel image data into binary image data by performing screen processing. The binary-data storage section 30 stores the binary image data generated by the binarizing section 20. The marking engine section 40 serves as an image printing section (image forming section), which prints an image on a sheet of paper serving as a recording medium. The control section 60 generally controls the operation of the image forming apparatus 1. Here, the color-separation-signal generating section 10, the binarizing section 20 and the binary-data storage section 30 form an image processing section (image processing apparatus) 100, which executes a binarizing process for converting multilevel image data into binary image data.

Image data Din_R, Din_G and Din_B (hereinafter referred to as "Din" simply) in accordance with color components such as R (red), G (green) and B (blue) and with a predetermined number of bits (e.g. 8 to 10 bits) are input into the color-separation-signal generating section 10 from a personal computer (PC) 3 or an image reader 4 such as a scanner connected through a network or the like. The color-separation-signal generating section 10 generates image data DMV_C, DMV_M, DMV_Y and DMV_K (hereinafter referred to as "DMV" simply), for example, in accordance with color components of C (cyan), M (magenta), Y (yellow) and K (black) corresponding to toner colors used in a process in the marking engine section 40 from the acquired image data Din_R, Din_G and Din_B in accordance with the color components. That is, the color-separation-signal generating section 10 performs a mapping process for converting multi-value RGB color system image data Din_R, Din_G and Din_B with a predetermined number of bits into multi-value CMYK color system image data DMV_C, DMV_M, DMV_Y and DMV_K with a predetermined number of bits.

Incidentally, in the color-separation-signal generating section 10, predetermined image processing (preprocessing) such as base color removal, variable power processing, contrast control (density control), color correction, filtering, TRC (Tone Reproduction Control) correction (also called "gradation correction"), etc. is performed concurrently in addition to the mapping process.

The binarizing section 20 generates binarized data (1-bit image data) by performing screen processing on the respective multilevel image data DMV_C, DMV_M, DMV_Y and DMV_K of the color components, which are input from the color-separation-signal generating section 10. That is, the binarizing section 20 generates binarized recording signal Dout, which represents the density of a halftone image in a pseudo manner with a size of colored dot called "halftone dot," from the image data DMV_C, DMV_M, DMV_Y and DMV_K, which are multilevel image information having density gradations.

The binary-data storage section 30 stores the binarized recording signal Dout generated by the binarizing section 20.

The marking engine section 40 reads the binarized recording signal Dout from the binary-data storage section 30 and prints an image on a sheet of paper with using the binarized recording signal Dout. Various methods such as a method of using an electrophotographic system using toner as a coloring material, a method using an ink-jet technique using ink as a coloring material, a method using an engraving printing technique (e.g. lithographic technique) for making a printing plate and transferring ink onto a sheet of recording paper by using the printing plate, etc. can be used in the marking engine section 40. In the image forming apparatus 1 according to this exemplary embodiment, the case where configuration using an electrophotographic system is used is taken as an example.

The electrophotographic type marking engine section 40 used in this exemplary embodiment will be described below. As shown in FIG. 1, the marking engine section 40 in this exemplary embodiment has four image forming units 46Y, 46M, 46C and 46K arranged side by side at regular intervals. Each of the image forming units 46Y, 46M, 46C and 46K has a photoconductor drum 41 for forming an electrostatic latent image and carrying a toner image, a charging roll 42 for electrostatically charging a surface of the photoconductor drum 41 with a predetermined electric potential evenly, a developer 43 for developing the electrostatic latent image formed on the photoconductor drum 41, and a drum cleaner 44 for cleaning the surface of the photoconductor drum 41 after transferring. Laser exposure devices 45Y, 45M, 45C and 45K for exposing the photoconductor drums 41 are provided so as to correspond to the image forming units 46Y, 46M, 46C and 46K respectively.

The image forming units 46Y, 46M, 46C and 46R have substantially the same configuration except toner contained in each developer 43. The image forming units 46Y, 46M, 46C and 46K form toner images of yellow (Y), magenta (M), cyan (C) and black (K) respectively.

The marking engine section 40 further has an intermediate transfer belt 50 for multiplexedly transferring respective color toner images formed by the photoconductor drums 41 of the image forming units 46Y, 46M, 46C and 46K, first transfer rolls 47 for (first) transferring the respective color toner images of the image forming units 46Y, 46M, 46C and 46K successively onto the intermediate transfer belt 50 at first transfer portions T1, a second transfer roll 48 for (second) transferring the superposed toner images transferred onto the intermediate transfer belt 50, collectively onto a sheet of paper P as a recording medium (recording paper) at a second transfer portion T2, and a fixing device 54 for fixing the second transferred image onto the sheet of paper P.

The binarized recording signal Dout read from the binary-data storage section 30 is supplied to the laser exposure devices 45Y, 45M, 45C and 45K of the marking engine section 40. Each of the laser exposure devices 45Y, 45M, 45C and 45K generates laser light modulated based on the binarized recording signal Dout acquired from the binary-data storage section 30. For example, in the image forming unit 46Y of yellow (Y), the surface of the photoconductor drum 41 electrostatically charged with a predetermined electric potential evenly by the charging roll 42 is scanned with and exposed to the laser light generated by the laser exposure device 45Y, so that an electrostatic latent image is formed on the photoconductor drum 41. The electrostatic latent image formed thus is developed by the developer 43, so that a toner image of Y is formed on the photoconductor drum 41. Also in the image forming units 46M, 46C and 46K, respective color toner images of M, C and K are formed in the same manner as described above.

The respective color toner images formed by the image forming units 46Y, 46M, 46C and 46K are electrostatically sucked successively onto the intermediate transfer belt 50 rotating in the direction of the arrow A in FIG. 1, by the first transfer rolls 47. Thus, the toner images superposed on one another are formed on the intermediate transfer belt 50. As the intermediate transfer belt 50 moves, the superposed toner images are carried to the second transfer portion T2 provided with the second transfer roll 48. When the superposed toner images are conveyed to the second transfer portion T2, a sheet of paper P is fed from a paper cassette 53 to the second transfer portion T2 in accordance with the timing of conveying the toner images to the second transfer portion T2. The superposed toner images are electrostatically transferred collectively onto the fed sheet of paper P on the basis of a transfer electric field formed at the second transfer portion T2 by the second transfer roll 48.

Then, the sheet of paper P onto which the superposed toner images have been already electrostatically transferred is separated from the intermediate transfer belt 50 and conveyed to the fixing device 54 by conveyance belts 51 and 52. The toner images which have been not fixed yet but have been placed on the sheet of paper P conveyed to the fixing device 54 are subjected to a fixing process under heat and pressure by the fixing device 54, so that the toner images are fixed onto the sheet of paper P. The sheet of paper P on which the fixed image has been already formed is conveyed to a paper ejection stack portion (not shown) provided in a paper ejection portion of the image forming apparatus.

The binarizing section 20 provided in the image forming apparatus 1 according to this exemplary embodiment will be described next.

The binarizing section 20 of this exemplary embodiment generates the binarized recording signal Dout, which represents the density of each halftone image in a pseudo manner with the size of colored dots called "halftone dot," from the multilevel image data DMV, which are input from the color-separation-signal generating section 10 and which have density gradations of the respective color components. On this occasion, the binarizing section 20 of this exemplary embodiment generates the binarized recording signal Dout so that a hollow-structure (ring-like) halftone dot internally contains gap in an intermediate density range (halftone range).

Figure 2A:
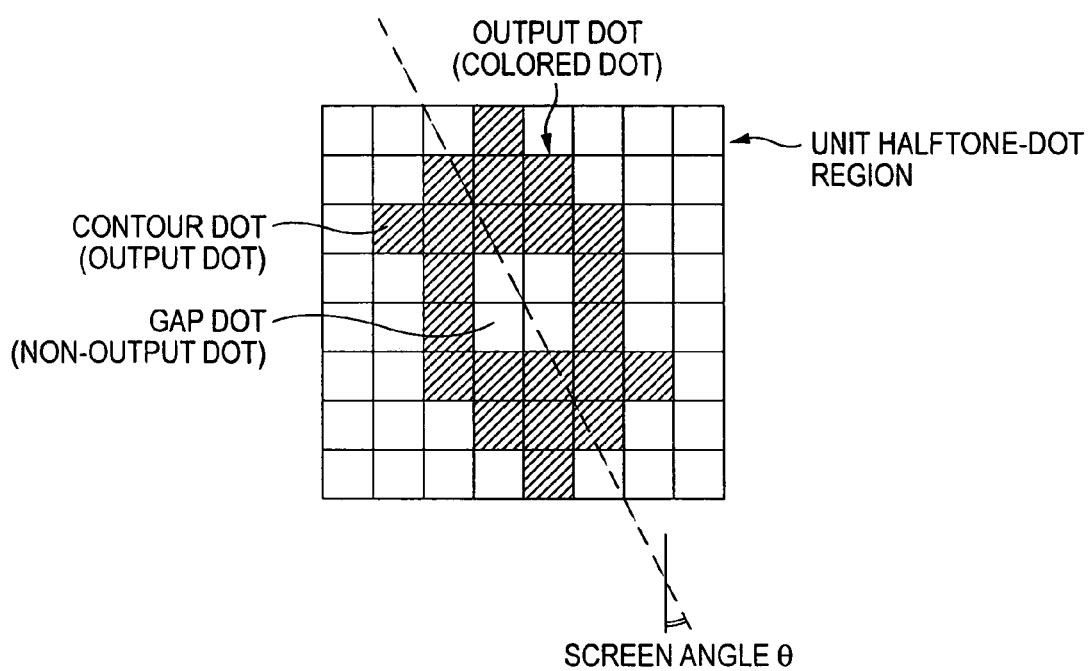
FIG. 2A to 2H is a view showing an example of a halftone dot represented in 64 gradations of 6 bits.
Figure 2B:
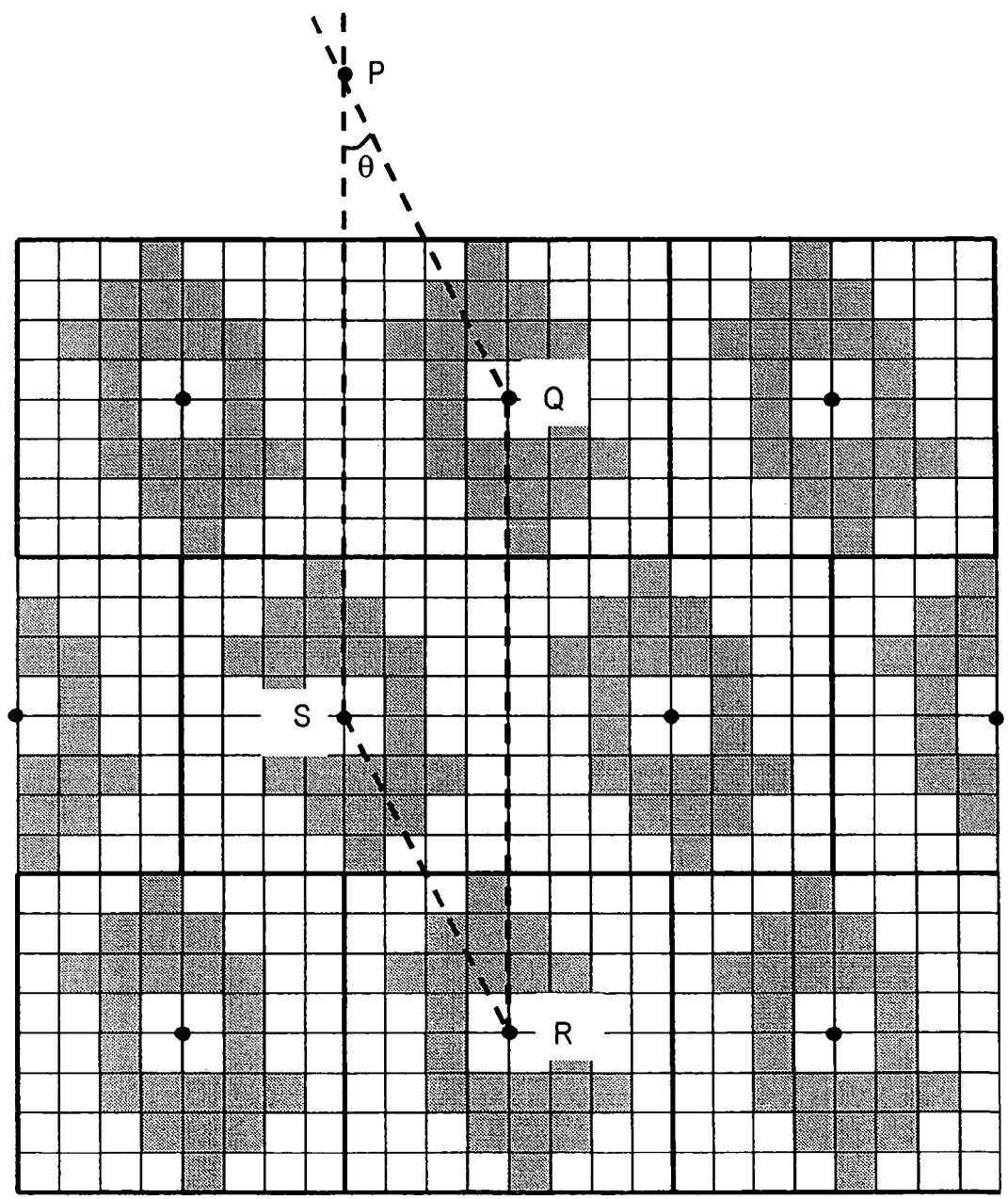

FIG. 2A is a view showing an example of the halftone dot, which is formed when the density of the input image is in the intermediate density range (hereinafter, may be referred to as "the halftone dot formed in the intermediate density range"). As shown in FIG. 2A, each halftone dot is formed in a unit halftone-dot region (in this exemplary embodiment, a region of 8 pixels×8 pixels). As shown in FIG. 2B, centers of the unit halftone-dot regions are arranged on intersections between a first set of parallel lines (for example, including a line PQ and a line SR) and a second set of parallel lines (for example, including a line QR and a line RP). An angle $\theta$ between one of the first and second sets of parallel lines (e.g. the line PQ in FIG. 2B) and the vertical line is referred to as a "screen angle."

The halftone dot includes a single aggregation of output dots (may be referred to as "colored dots," "pixel dots," or "black dots"). Output dots forming the contour portion (outermost portion) of the halftone dot will be referred to as "contour dots." When the halftone dot includes a gap formed of non-output dots (may be referred to as "non-pixel dots" or "white dots"), all the non-output dots are surrounded by the output dots. In other words, non-output dot does not form the contour of the halftone dot.

Figure 2C:
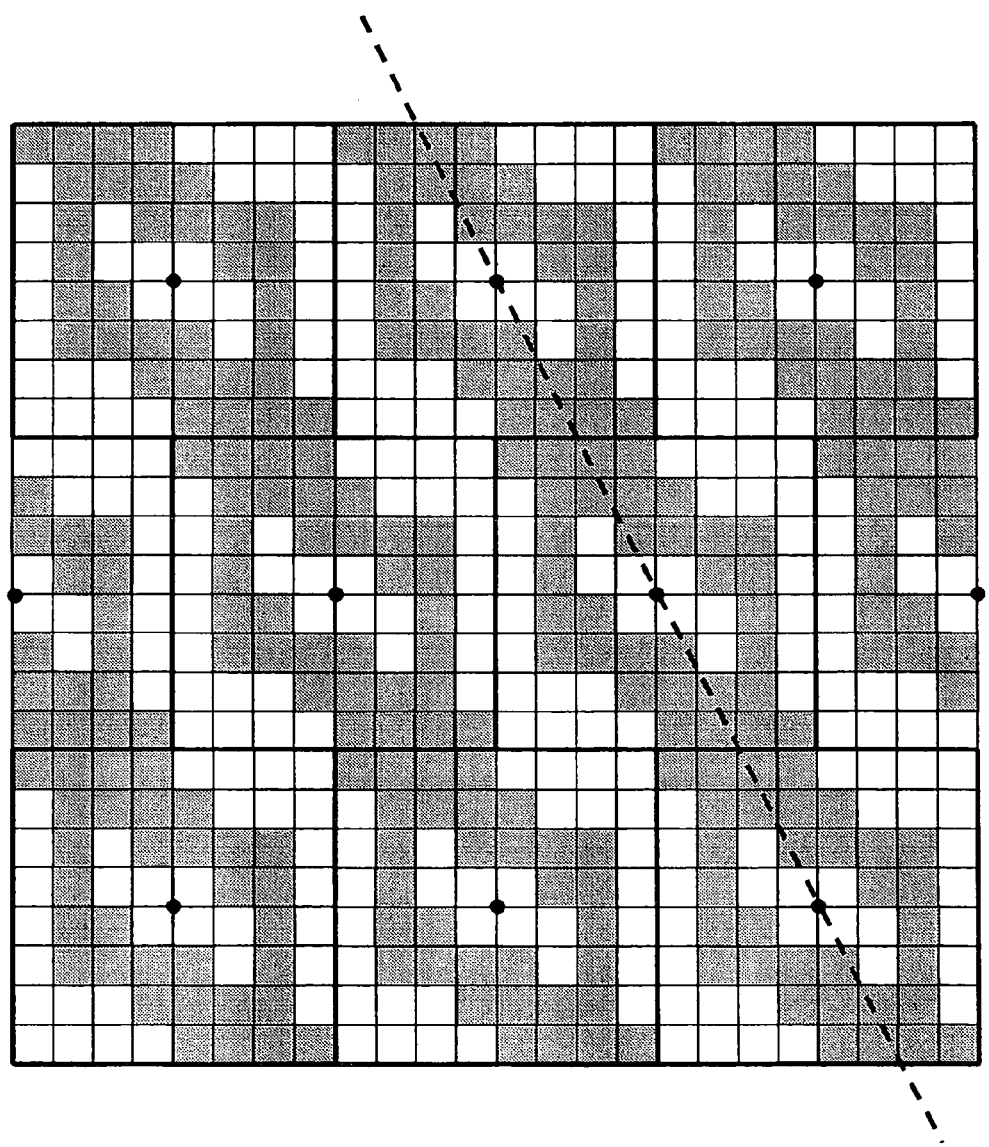

The binarizing section 20 generates the halftone dots filed in the intermediate density region so that the halftone dots linearly continues in the screen-angle direction so as to form a line screen (substantially liner-shape structure) as shown in FIG. 2C. It is noted that FIGS. 2B and 2C correspond to different densities of the input image.

Turning to FIG. 2A, the binarizing section 20 generates the halftone dot formed in the intermediate density range so that white dots (non-output dots) for forming gap are arranged in contour dots (output dots) for forming the contour of the halftone dot. Particularly, the binarizing section 20 of this exemplary embodiment generates the halftone dot formed in the intermediate density range so that the halftone dot has a shape extending in a direction of a predetermined angle such as the screen angle $\theta$. In other words, the binarizing section 20 enlarges pixel dots in the direction of the screen angle $\theta$ in accordance with the density of the multilevel image signal DMV. Incidentally, FIG. 2 shows an example of the halftone dot, which can expresses 64 gradations with 6 bits.

Figure 2D:
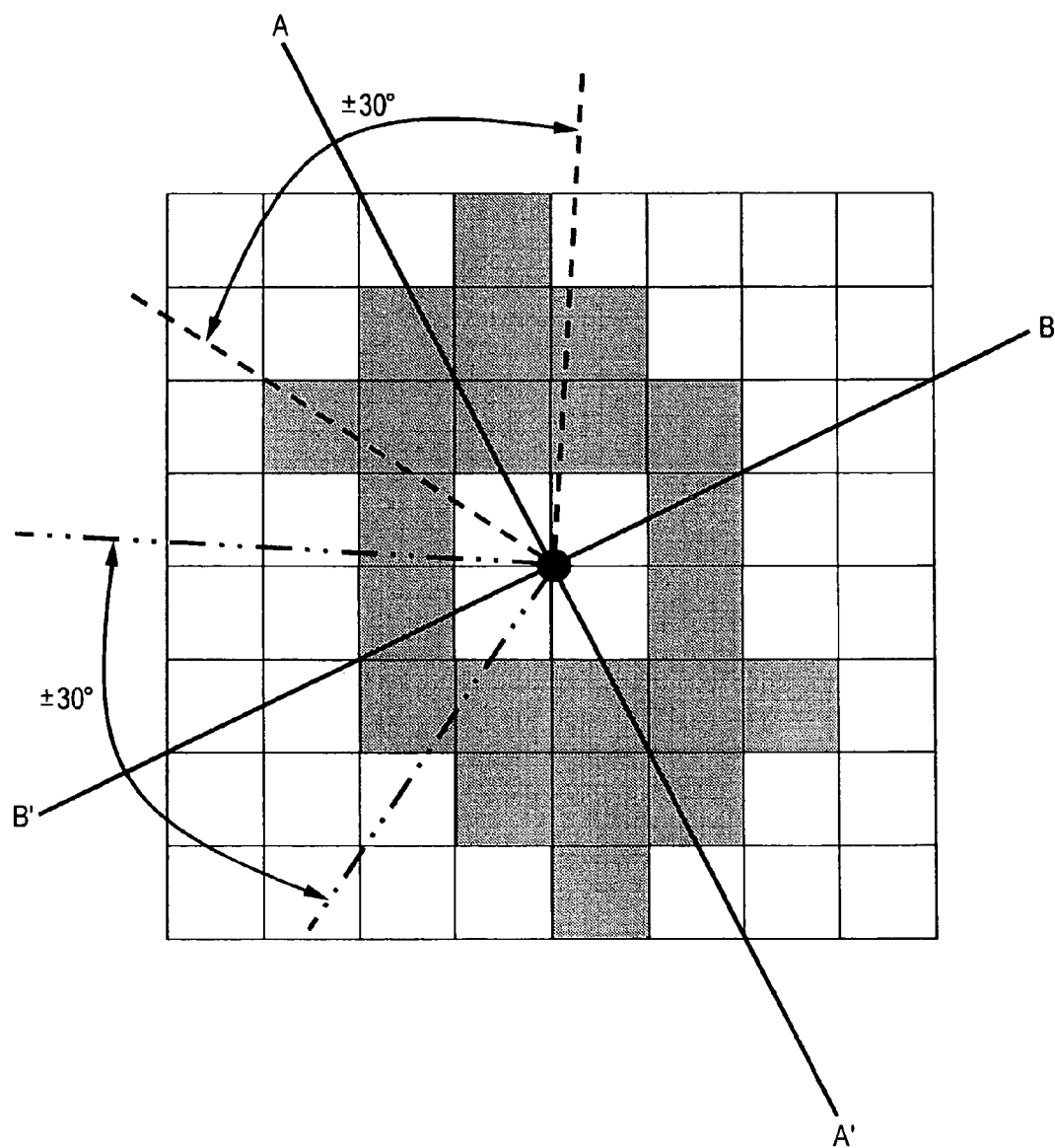
Figure 2E:
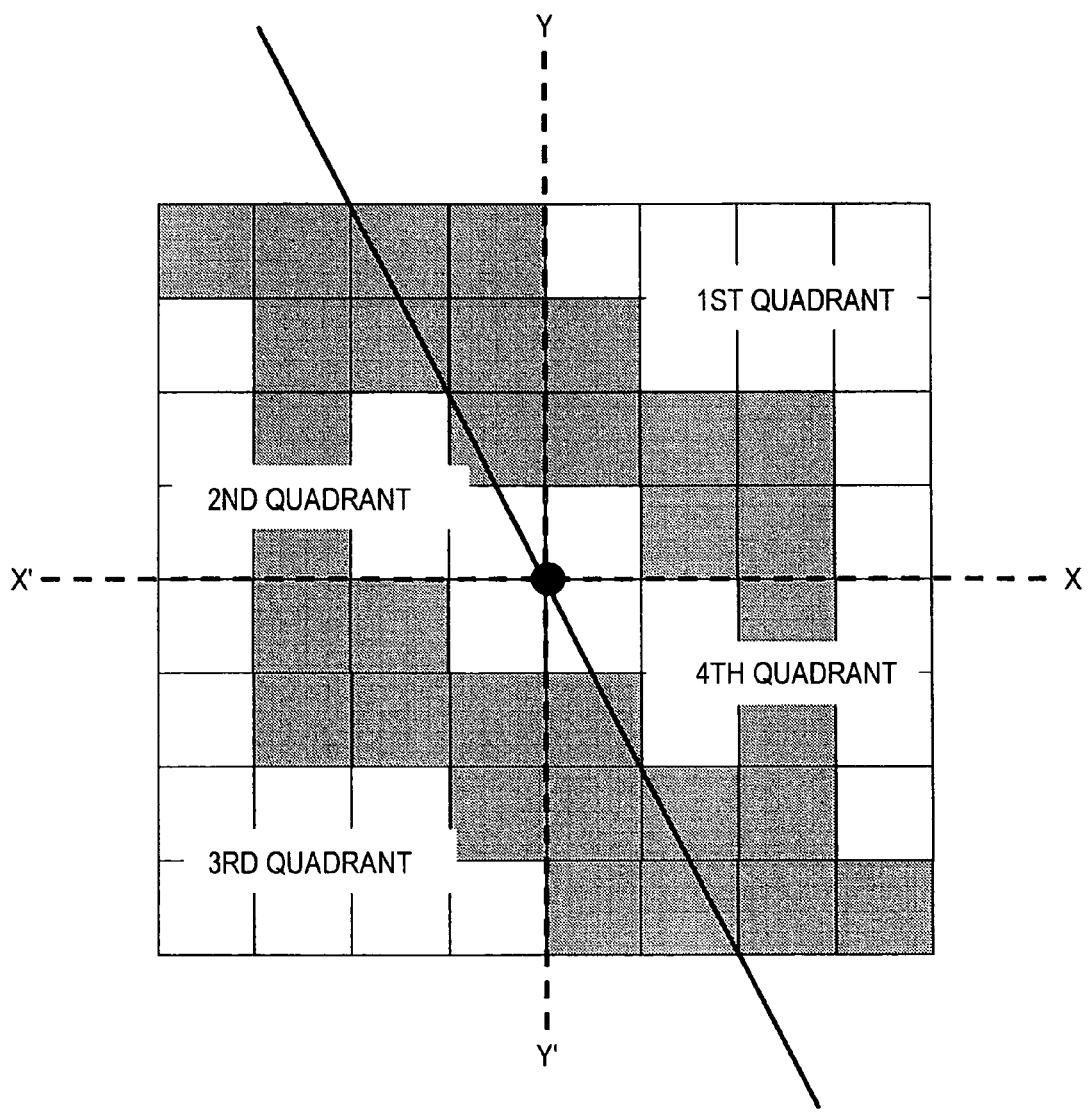
Figure 2F:
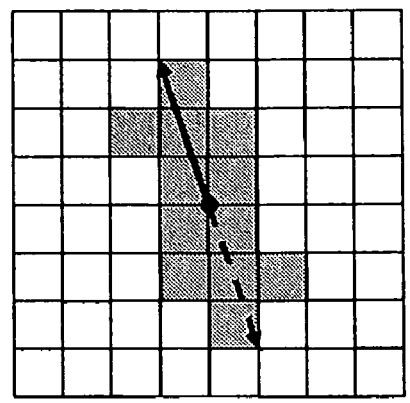
Figure 2G:
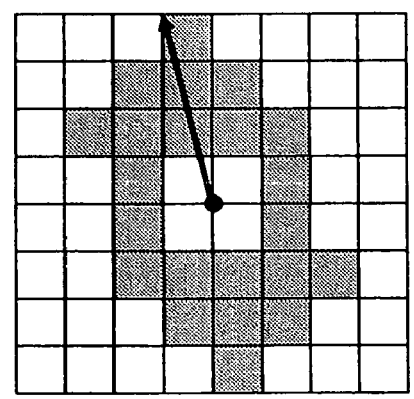
Figure 2H:
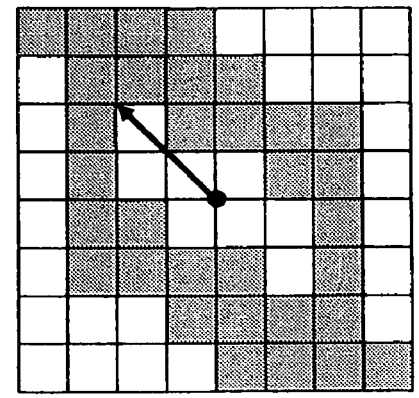
Figure 3A:
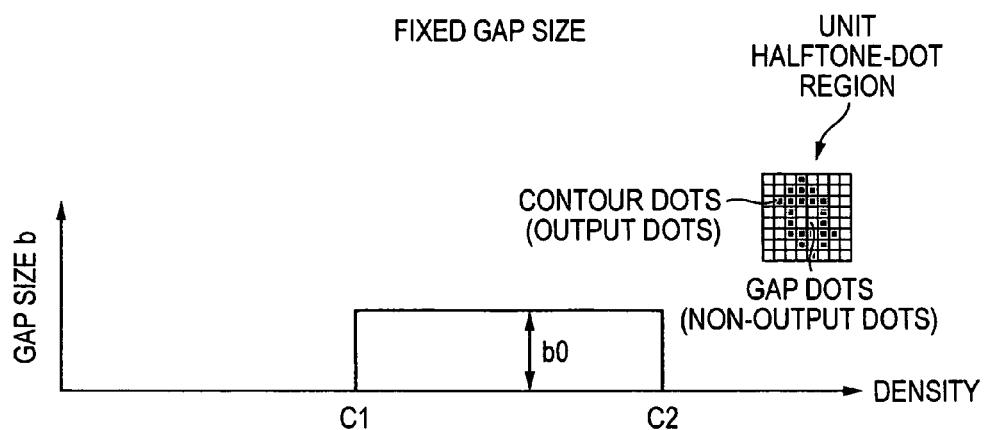
FIGS. 3A and 3B are graphs for explaining characteristic of threshold data used for forming gap by a binarizing section; the binarizing section.
Figure 3B:
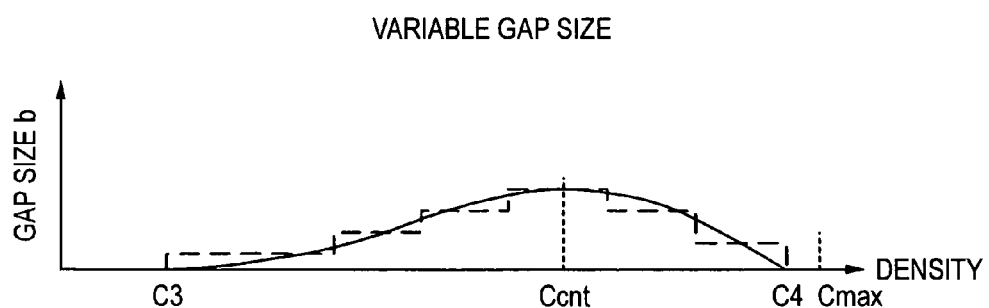

FIGS. 3A and 3B are graphs for explaining the characteristic of threshold data, which is used for forming the gap (see FIG. 2) when the binarizing section 20 of this exemplary embodiment generates the binarized recording signal Dout. This exemplary embodiment, as shown in FIG. 3A, may use threshold data, which causes a gap-size profile to form gap having a predetermined area (e.g. b0) in the halftone dot formed in the predetermined density range (intermediate density range). Alternatively, this exemplary embodiment, as shown in FIG. 3B, may use threshold data, which causes the gap-size profile to form gap having an area, which is variable according to the density of the multilevel image data DMV, in the halftone dot formed in the predetermined density range (intermediate density range).

First densities C1 and C3 shown in FIGS. 3A and 3B are densities on the low density side at which it is started to form gap. Second densities C2 and C4 shown in FIGS. 3A and 3B are densities on the high density side at which it is started to form the gap. Density Ccnt shown in FIG. 3A is a density for forming the largest number of gaps (non-output dots). In other words, the density Ccnt is a density for turning the number of gaps from increase to decrease and may be referred to as "transition density Ccnt." Particularly, the transition density Ccnt is set as follows. That is, if an intensity of the multilevel image data DMV, which represents the input image, (corresponding to the density of the input image) is changed from the low intensity side, ail of binarized data representing a halftone dot output by a first comparison section 211 (shown in FIG. 4; described later firstly become output dots at the transition density Ccnt.

Although the transition density Ccnt is described here as a single density value, a region where the number of gaps is at maximum may be set to be in a predetermined density range. Such settings may be included in this exemplary embodiment of the invention.

Incidentally, the reason why the first densities C1 and C3 on the low density side at which it is started to form gap are set is that the first densities C1 and C3 are inevitable to arrange white dots (non-output dots) inside the halftone dot while keeping the contour of the halftone dot formed of the set of black dots (output dots) as black dots. On the other hand, the second densities C2 and C4 on the high density side at which it is started to form the gap are not essential because the second densities C2 and C4 are used to arrange white dots in the halftone dot only in the intermediate density range (halftone range). That is, an image density range from the first densities C1 and C3 on the low density side at which it is started to form gap the maximum density to Cmax may be the process-target density range where white dots are arranged inside the colored dots.

Figure 4:
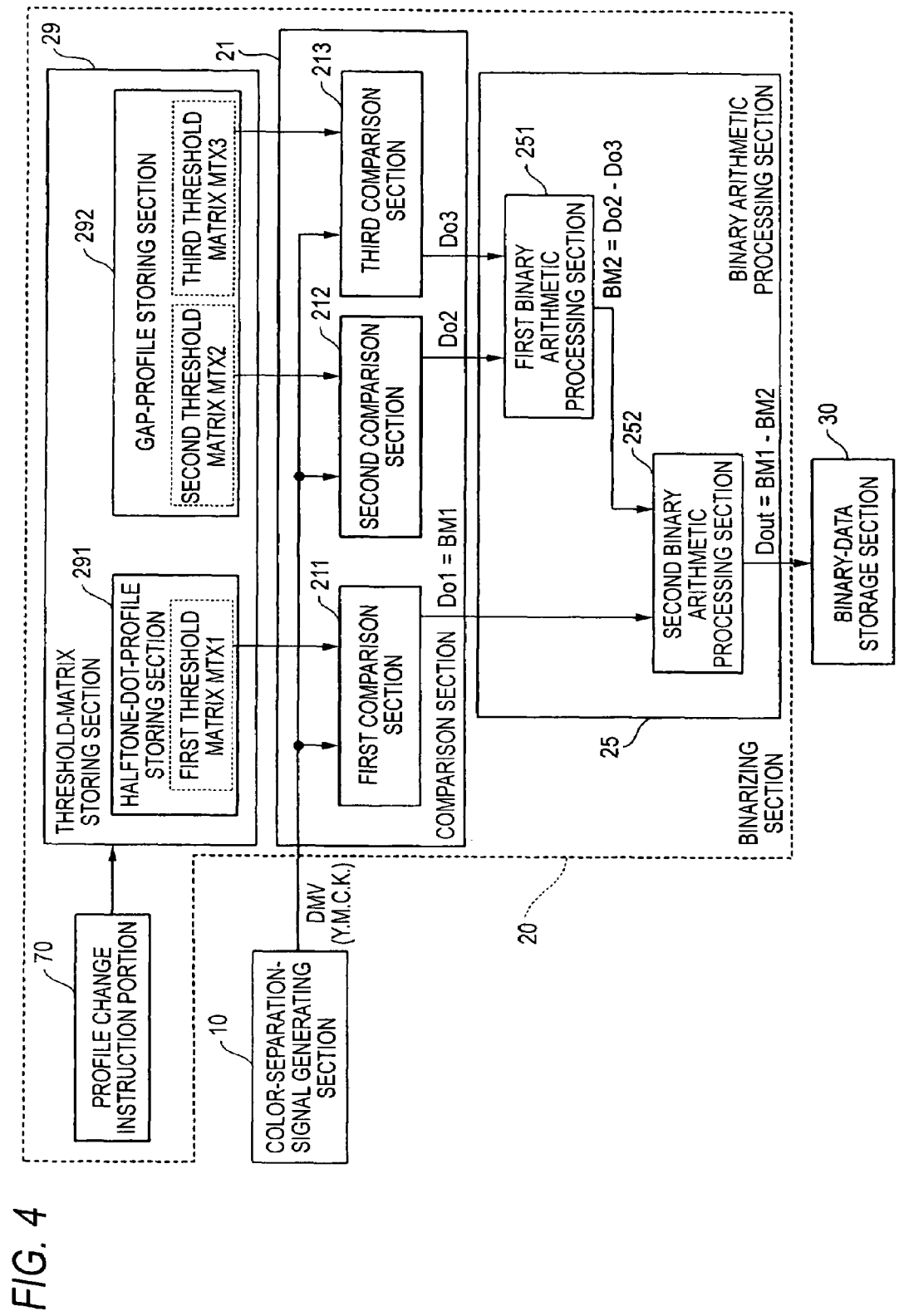

FIG. 4 is a block diagram showing the configuration of the binarizing section 20 according to this exemplary embodiment. As shown in FIG. 4, the binarizing section 20 of this exemplary embodiment includes a threshold-matrix storing section 29, a comparison section 21 and binary arithmetic processing section. The threshold-matrix storing section 29 stores threshold values corresponding to respective coordinate values of a pixel matrix in a unit halftone-dot region (see FIG. 2) as a threshold matrix. The comparison section 21 performs comparison for binarizing by referring to the multilevel image data DMV of each color component, which is input from the color separation generating portion 10 as a process target, and the threshold matrix stored in the threshold-matrix storing section 29. The binary arithmetic processing section 25 performs a logical arithmetic processing on the binary data output from the comparison section 21.

The threshold-matrix storing section 29 has a halftone-dot-profile storing section 291 and a gap-profile storing section 292. The halftone-dot-profile storing section 291 stores profile data, which is used as a base for forming a halftone dot (see FIG. 2). The gap-profile storing section 292 stores profile data to define gap size corresponding to the density of the input image, that is, to define the density of the input image, which causes gap to be formed.

The halftone-dot-profile storing section 291 stores a first threshold matrix MTX1, which is profile data to define a halftone-dot size corresponding to the density of the input image that is, to define the density of the input image, which causes the gap to be formed. The first threshold matrix MTX1 also gives a halftone-dot size profile, which is formed of a set of threshold data for halftone-dot formation used in the halftone-dot formation process. Basically, the first threshold matrix MTX1 is set so that a dot pattern similar to the halftone-dot growth according to the related art can be output. Furthermore, this exemplary embodiment sets the first threshold matrix MTX1 so that: (i) the number of output dots gradually increases preferentially in a direction of a predetermined angle (e.g. screen angle θ) in a unit halftone-dot region when the density of the input image increases from 0 until to the transition density Ccnt, and that (ii) all dots in the unit halftone-dot region are formed as output dots when the density of the input image is equal to or larger than the transition density Ccnt.

The term "preferentially" means that when the density of the input image increases from 0 to the transition density Ccnt, an increasing amount of the number of output dots in the unit halftone-dot region is larger in the direction of the predetermined angle (e.g. screen angle θ) than that in a direction perpendicular to the direction of the predetermined angle.

Specifically, referring to FIG. 2D, the term "preferentially" may mean that when the density of the input image increases from 0 to the transition density Ccnt, the halftone dot grows so that the number of output dots (or an area of output dots) in a region between dotted lines is larger than that in a region between double-dashed dotted line. The dotted lines are obtained by rotating a line AA' ± predetermined angles (e.g. ±30 degrees), the line AA' which has the screen angle θ and passes through the center of the unit halftone-dot region. Also, the double-dashed dotted lines are obtained by rotating a line BB' ± the predetermined angles (e.g. ±30 degrees), the line BB' which is perpendicular to the line AA' and passes through the center of the unit halftone-dot region. It is noted that the rotating angle is not limited to ± 30 degrees, but may be selected appropriately.

Alternatively, the term "preferentially" may be specifically defined as shown in FIG. 2E. That is, in FIG. 2E, the unit halftone-dot region is divided into four quadrants by X and Y axes. The term "preferentially" may mean that when the density of the input image increases from 0 to the transition density Ccnt, the halftone dot grows so that the number of output dots in quadrants (e.g. the second and fourth quadrants) including the line, which has the screen angle θ and passes through the center of the unit halftone-dot region, is larger than that in the other quadrants (e.g. the first and third quadrants).

Further alternatively, the term "preferentially" may be defined with a "growth vector" shown in FIGS. 2F and 2G. The "growth vector" is defined as a vector connecting the center of the unit halftone-dot region and a contour point of the halftone dot farthest from the center. The solid vectors shown in FIGS. 2F and 2G are examples of the growth vector. If the halftone dot grows symmetrically with respect to the center of the unit halftone-dot region, two growth vectors (solid and dotted vectors shown in FIG. 2F) are obtained from the single unit halftone-dot region. In the following description, the upper one of the growth vectors is used. The growth vector is calculated at each of densities from 0 to a density at which the contour dot of the half-tone dot reaches the contour of the unit halftone-dot region (as shown in FIG. 2G). Then, an average of the growth vectors is calculated, which will be referred to as an "average growth vector." The average growth vector shows a direction in which the halftone dot grows (is enlarged). The expression "the halftone dot is enlarged in the predetermined direction preferentially" may mean that the halftone dot is enlarged so that an angle between a line having the screen angle (e.g. the line PQ shown in FIG. 2C) and the average growth vector is in a predetermined range (e.g. ±30 degrees).

The gap-profile storing section 292 stores second and third threshold matrices MTX2 and MTX3 to give gap-size profile formed of a set of gap-forming threshold data used in the gap forming process of this exemplary embodiment.

The second threshold matrix MTX2 stored in the gap-profile storing section 292 chiefly defines gap size on the low density side of the intermediate density range for the multilevel image data DMV input from the color-separation-signal generating section 10. The third threshold matrix MTX3 chiefly defines gap size on the high density side of the intermediate density range for the multilevel image data DMV. Gap size over the entire intermediate density range of the multilevel image data DMV is defined by synthesizing the gap size defined by the second threshold matrix MTX2 and the gap size defined by the third threshold matrix MTX3. On this occasion, the gap is formed so that the number of gap-forming dots (white dots) gradually increases (the gap-forming dots are enlarged) or decreases (the gap-forming dots are reduced) preferentially in the direction of the predetermined angle (e.g. screen angle θ) in the same manner as in the case of the halftone-dot-profile storing section 291 (first threshold matrix MTX1).

Specifically, as shown in FIG. 2D, when the density of the input image increases from 0 to the transition density Ccnt, the gap grows so that the number of non-output dots forming the gap (or an area of non-output dots forming the gap) in the region between the dotted lines is larger than that in the region between the double-dashed dotted line. Also, when the density of the input image increases from the transition density Ccnt to Cmax, the gap regresses from the maximum-size gap, which is formed at the transition density Ccnt, so that the number of dots, which are in the region between the dotted lines and are changed from non-output dots to output dots, is larger than that in the region between the double-dashed dotted line.

Alternatively, as shown in FIG. 2E, it is assumed that the unit halftone-dot region is divided into the four quadrants by the X and Y axes. In this case, when the density of the input image increases from 0 to the transition density Ccnt, the number of non-output dots forming the gap in the quadrants (e.g. the second and fourth quadrants) including the line, which has the screen angle θ and passes through the center of the unit halftone-dot region, is larger than that in the other quadrants (e.g. the first and third quadrants). Also, when the density of the input image increases from the transition density Ccnt to Cmax, the gap regresses from the maximum-size gap so that the number of dots, which are in the region including the line (e.g. the second and fourth quadrants) and are changed from non-output dots to output dots, is larger than that in the other region (e.g. the first and third quadrants).

Further alternatively, the term "preferentially" may be defined with a "gap growth vector." The "gap growth vector" is defined as a vector connecting the center of the unit halftone-dot region and a point of the gap farthest from the center. The solid vector shown in FIG. 2H is an example of the gap growth vector. If the gap grows symmetrically with respect to the center of the unit halftone-dot region, two gap growth vectors are obtained from the single unit halftone-dot region. In the following description, the upper one of the gap growth vectors is used. The gap growth vector is calculated from the first density (C3) to the second density (C4). Then, an average of the gap growth vectors is calculated, which will be referred to as an "average gap growth vector." The average gap growth vector shows a direction in which the gap grows (is enlarged and reduced). The expression "the number of gap-forming dots gradually increases or decreases preferentially in the direction of the predetermined angle" may mean that the gap is enlarged or reduced so that an angle between a line having the screen angle (e.g. the line PQ shown in FIG. 2C) and the average gap growth vector is in a predetermined range (e.g. ±30 degrees).

Incidentally, the term "synthesizing" means logical synthesis as a result of comparison by referring to the second and third threshold matrices MTX2 ad MTX3 by the comparison section 21 and the binary arithmetic processing section 25.

The second and third threshold matrices MTX2 ad MTX3 stored in the gap-profile storing section 292 of this exemplary embodiment has characteristics of the gap-size profile as shown in FIGS. 2A, 3A and 3B. That is, the second and third threshold matrices MTX2 ad MTX3 are configured so that black dots (may be referred to as "output dots" or "pixel dots"), which form a halftone dot when the input density exceeds a predetermined density, are partially replaced with white dots (may be referred to as "non-output dots" or "non-pixel dots") to form gap. As a result, the amount of the coloring agent (toner in this exemplary embodiment) on the whole halftone-dot portion can be reduced.

The density at the point at which it is stared to form gap (e.g. the points C1 and C3 shown in FIGS. 3A and 3B) is set to be high to some degree so that no gap can be formed until the input density exceeds the predetermined density. Thereby, no gap is formed in a fine integrated (clustered) halftone dot.

Particularly, as shown in FIG. 2A, while vertical, horizontal and oblique output dots (may be referred to as "contour dots") of the outermost circumferential portion, which contribute to formation of the contour of the halftone dot, that is, the outer circumference of the halftone dot, are kept as output dots in the unit halftone-dot region, dots inside the contour dots are partially replaced with non-output dots to form gap.

If non-output dots are isolated in the contour dots when the non-output dots are formed inside the contour dots, there is a possibility that the effect in forming the coloring agent of the halftone dot as a thin layer may be reduced. This is because the thinned non-output dots inside the halftone dot are scattered. If output dots are further present in the aggregation of non-output dots, efficient light absorption can hardly be made. This is because the output dots are scattered. Therefore, the gap may be formed so that non-output dots are not isolated from each other but are formed as an aggregation. Also, from the viewpoint of keeping the contour, the shape of the aggregation of non-output dots may be similar to that of the contour of the halftone dot.

In addition, the halftone dot formed in the binarizing section 20 of this exemplary embodiment is formed with a shape extending in the direction of the screen angle θ. That is, the first threshold matrix MTX1 stored in the halftone-dot-profile storing section 291 and the second and third threshold matrices MTX2 and MTX3 stored in the gap-profile storing section 292 are set so that contour dots (output dots) of the halftone dot to be formed and white dots (non-output dots) for forming the gap extend along a predetermined angle such as a screen angle θ as shown in FIGS. 2A to 2C. Therefore, the binarizing section 20 of this exemplary embodiment forms such a line screen (nearly linear structure) in which a series of halftone dots are arranged along a line extending in the direction of the predetermined angle (screen angle θ), particularly when the density of the input image is in the intermediate density range (see FIGS. 2B, 2C and 7A).

The first, second and third threshold matrices MTX1, MTX2 and MTX3 may include threshold matrices of respective color components (Y, M, C, K), which are different from each other. For example, the first, second and third threshold matrices MTX1, MTX2 and MTX3 may be configured so that halftone dots formed by the binarizing section 20 based on the multilevel image data DMV_C, DMV_M, DMV_Y and DMV_K of the respective color components, which are input from the color-separation-signal generating section 10, may be represented with line screens having different screen angles, respectively. Specifically, halftone dots of color components (Y, M, C, K) can be formed so as to be represented with line screens having screen angles θ_C, θ_M, θ_Y and θ_K, respectively.

Similarly, halftone dots of color components (Y, M, C, K) may be also formed so as to be represented with line screens having different predetermined densities (line numbers), respectively.

A set of the contour dots (output dots) of the halftone dot generated in this exemplary embodiment increases the number of output dots in the direction of the predetermined angle (e.g. the screen angle θ) in accordance with the density of the input image so as to have a substantial parallelogram shape having a size corresponding to the density (e.g. see FIGS. 2A to 2C and 6). Output dots inside the halftone dot having the substantial parallelogram shape are thinned out so as to form gap, which also has a substantial parallelogram shape. That is, the number of non-output dots is gradually increased from the center of the halftone dot so that the set of non-output dots has the substantial parallelogram shape. Thus, the whole of the resultant "halftone dot having gap" is formed of output dots having the rink-like contour of a substantial parallelogram shaped.

In this case, the gap-profile storing section 292 may store profile data, for example, in accordance with either or both of the fixed gap-size system shown in FIG. 3A and the variable gap-size system shown in FIG. 3B. A value of the gap size b0 in FIG. 3A is only an example. The gap-profile storing section 292 may store plural profiles, which have various values of the gap size b0. Similarly, the characteristic curve in FIG. 3B is an example. The gap-profile storing section 292 may store plural profiles, which have various change characteristic (inclusive of the maximum value) of the characteristic curve. That is, any gap profiles can be used as long as a predetermined correlation can be set between the input image density and the gap size.

When the gap-profile storing section 292 stores such plural profiles, a profile change instruction section 70 for changing between the threshold matrices stored in the threshold-matrix storing section 29 is provided. In this case, an operation panel (not shown) is provided for accepting an instruction signal from a user so that any one of the gap profiles selected in accordance with the purpose by the profile change instruction section 70 ran be used.

In the "fixed gap-size system," gap having a fixed size b0 is formed in the substantial center of a halftone dot when the density value of the multilevel image data DMV is in a predetermined range (from the first density C1 to the second density C2) of the intermediate density range. On the other hand, the "variable gap-size system," the gap size as represented by the solid-line curve in FIG. 3B is changed dynamically (nearly continuously) in accordance with the density value of the multilevel image data DMV so that when the density value of the multilevel image data DMV is in a predetermined range (from the first density C3 to the second density C4) of the intermediate density range, the gap size increases gradually, and then decreases gradually after the gap size reaches the maximum value.

When the fixed gap-size system is used, simple profile configuration can be provided because only one kind of gap size b0 is required to designate for the predetermined range (from the first density C1 to the second density C2) of the intermediate density range. There is, however, a possibility that a pseudo contour may be generated in the gap generating position though a generation mechanism of the pseudo contour is unknown. In this case, the variable gap-size system for designating different gap sizes in accordance with densities can be used for eliminating the pseudo contour.

If a relatively large gap (but smaller than a halftone dot) is formed in the relatively small halftone dot so that the number of white dots thinned out inside the halftone dot is too large, there is a tendency that the function of forming the coloring agent of the halftone dot portion as a thin layer becomes too strong. Therefore, increasing the gap size gently at the time of rising is effective with respect to the gap size change characteristic in a density range of from the first density C1, C3 on the low density side at which it is started to the transition density Ccnt.

Incidentally, in the gap size change characteristic represented by the solid-line curve in FIG. 3B, the characteristic curve is represented as a smooth curve, which changes nearly continuously. For formation of the gap in the halftone dot, stepwise changing characteristic is actually provided because the gap size is decided in accordance with whether or not a dot is formed in a coordinate position in a unit halftone-dot region having a predetermined size.

As represented by the broken-line curve in FIG. 3B, a system in which the gap size is changed stepwise in accordance with the density so that the gap size increases gradually when the density value of the multilevel image data DMV is in a predetermined range of the intermediate density range, and then decreases gradually after the density reaches the maximum value, may be used as an intermediate system between the fixed gap-size system and the variable gap-size system.

The comparison section 21 has a first comparison section 211, a second comparison section 212 and a third comparison section 213. The first comparison section 211 compares the multilevel image data DMV of each color component, which are input from the color-separation-signal generating section 10, with the first threshold matrix MTX1 stored in the halftone-dot-profile storing section 291 and generates binary data Do1. The second comparison section 212 compares the multilevel image data DMV with the second threshold matrix MTX2 stored in the gap-profile storing section 292 and generates binary data Do2. The third comparison section 213 compares the multilevel image data DMV with the third threshold matrix MTX3 stored in the halftone-dot-profile storing section 292 and generates binary data Do3.

The binary arithmetic processing section 25 has a first binary arithmetic processing section 251 and a second binary arithmetic processing section 252. The first binary arithmetic processing section 251 performs a predetermined logical arithmetic processing, specifically, a differential operation between the binary data Do2 output from the second comparison section 212 and the binary data Do3 output from the third comparison section 213. The second binary arithmetic processing section 252 handles the binary data Do1 output from the first comparison section 211 as first bitmap data SM1 and handles the logical arithmetic processing result output from the first binary arithmetic processing section 251 as second bitmap data BM2. The second binary arithmetic processing section 252 performs a predetermined logical arithmetic processing, specifically, a differential operation between the first bitmap data BM1 and the second bitmap data BM2 to thereby generate a binarized recording signal Dout.

The binarized recording signal Dout generated by the binary arithmetic processing section 25 is once stored in the binary-data storage section 30. The binarized recording signal Dout is then used for an image recording process performed by the marking engine section 40. Specifically, the marking engine section 40 prints an image on the basis of the binarized recording signal Dout, which is binarized data, so that the inside of contour dots generated by the second binary arithmetic processing section 252 is partially formed as actual non-output dots.

Next, the binarizing process (halftone-dot processing) performed by the binarizing section 20 of this exemplary embodiment will be described. It is assumed that in the halftone-dot processing of this exemplary embodiment, the gap-profile storing section 291 stores gap-size profile data of a variable gap-size system shown in FIG. 3B.

Figure 5:
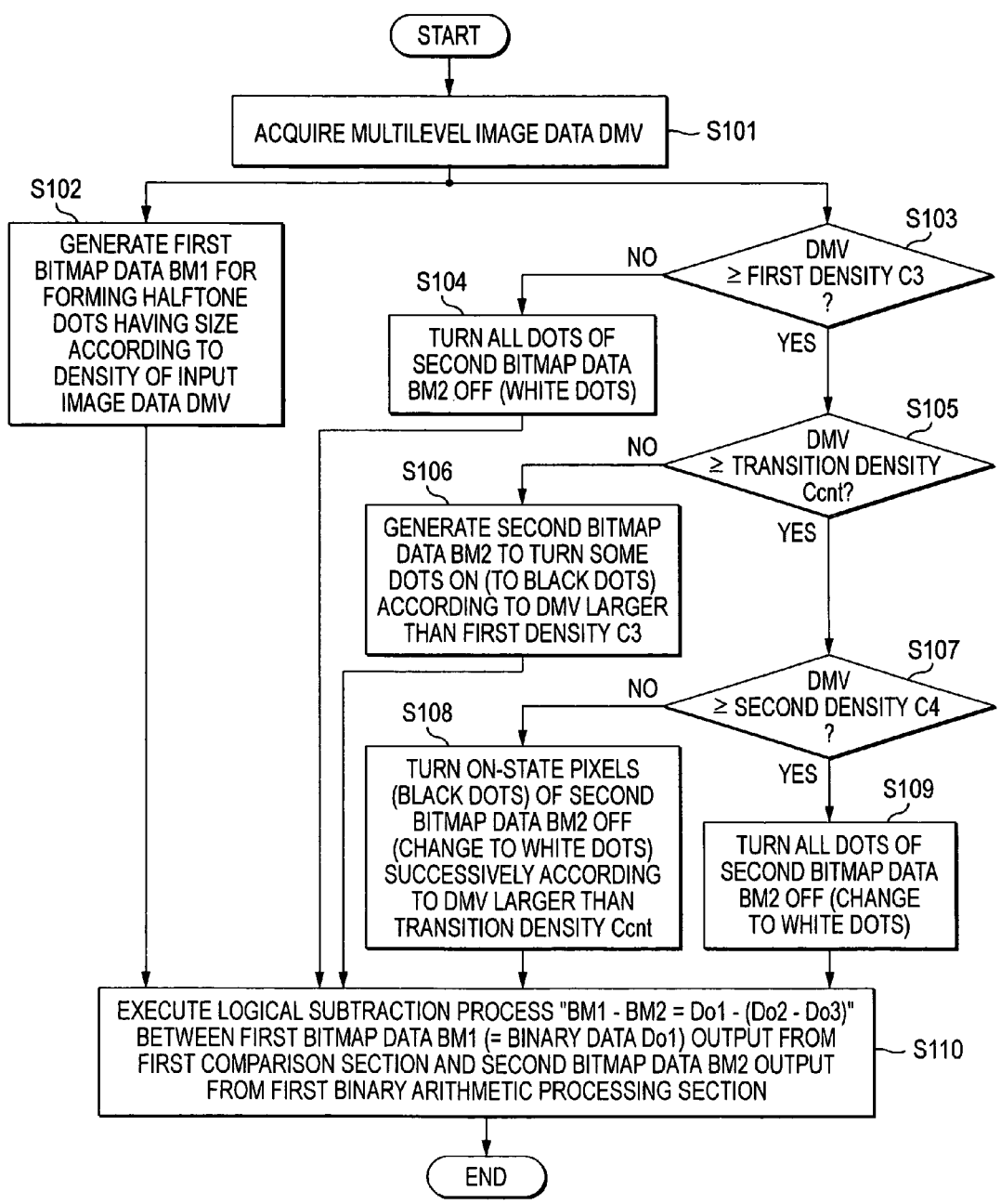
FIG. 5 is a flow chart showing the outline of a procedure of halftone-dot processing in the binarizing section.
Figure 6:
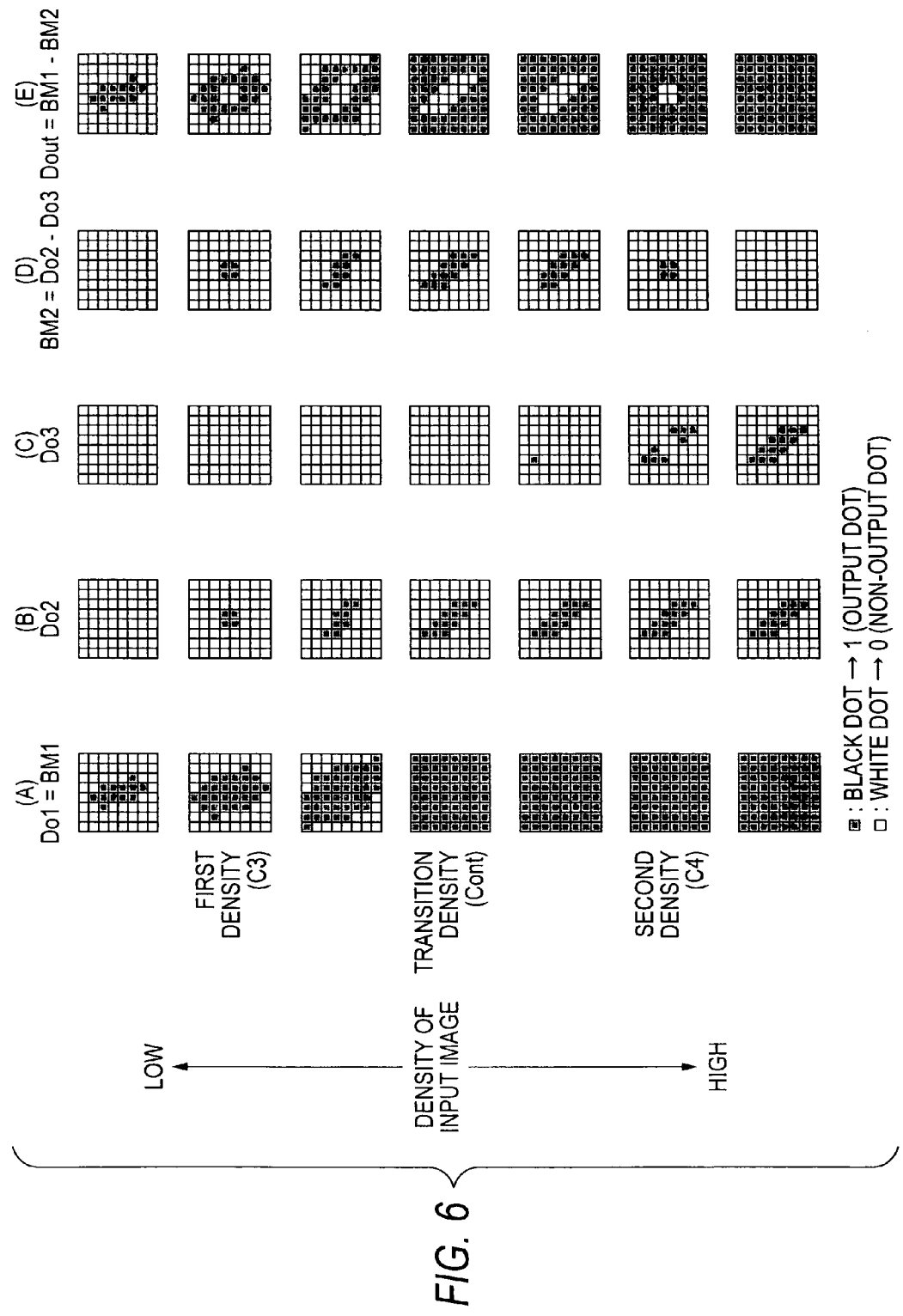
FIG. 6 is a view showing processes of production of ring-like halftone dots by halftone-dot processing in the binarizing section.

FIG. 5 is a flow chart showing the outline of a procedure of the halftone-dot processing performed by the binarizing section 20 of this exemplary embodiment. FIGS. 6(A) to 6(E) are views showing processes of generation of ring-like halftone dots in the halftone-dot processing performed by the binarizing section 20 of this exemplary embodiment. FIG. 6(A) shows an example of the binary data Do1 output from the first comparison section 211, that is, an example of the first bitmap data BM1. FIG. 6(B) shows an example of the binary data Do2 output from the second comparison section 212. FIG. 6(C) shows an example of the binary data Do3 output from the third comparison section 213. FIG. 6(D) shows an example of the second bitmap data BM2 output from the first binary arithmetic processing section 251. FIG. 6(E) shows an example of the binarized recording signal Dout output front the second binary arithmetic processing section 252.

First, processes performed in respective functional portions will be organized as a prerequisite of the halftone-dot processing performed by the binarizing section 20 of this exemplary embodiment. First, the first comparison section 211 compares the multilevel image data DMV of each color component, which is input from the color-separation-signal generating section 10, with the first threshold matrix MTX1 stored in the halftone-dot-profile storing section 291. As described above, the first threshold matrix MTX1 is set to output such a halftone-dot pattern that the size of the halftone dot is grown along a predetermined angle (e.g. screen angle θ) in accordance with the density of the input image information (multilevel image data DMV) until the density reaches the transition density Ccnt. The first comparison section 211 outputs such a halftone-dot pattern as the binary data Do1, that is, as the first bitmap data (first image data) BM1 (see FIG. 6(A)). Accordingly, the halftone-dot-profile storing section 291 and the first comparison section 211 functions as a first image-data generating section.

The second comparison section 212 compares the multilevel image data DMV of each color component, which is input from the color-separation-signal generating section 10, with the second threshold matrix MTX2 stored in the gap-profile storing section 292. As described above, the second threshold matrix MTX2 is set to output such gap pattern that the size of white dots is grown along substantially the same angle (e.g. screen angle θ) as the direction in which the output dots of the halftone-dot pattern is grown by the first threshold matrix MTX1 in accordance with the density of the input image information (multilevel image data DMV) while the contour dots (contour) in dots of the binary data Do1 (=first bitmap data BM1) are kept when the density of the multilevel image data DMV is in a density range of from the density (first density) C3 on the low density side at which it is started to form gap to the transition density Ccnt. Further, the second threshold matrix MTX2 is set so that the gap pattern at the transition density Ccnt is kept when the density is in equal to or larger than the transition density Ccnt. The second comparison section 212 outputs such a gap dot pattern as the binary data Do2 (see FIG. 6(B)).

The third comparison section 213 compares the multilevel image data DMV of each color component, which is input from the color-separation-signal generating section 10, with the third threshold matrix MTX3 stored in the gap-profile storing section 292. The third threshold matrix MTX3 is set so that dots are grown to have such a pattern that the inside of dots of the binary data Do2 is filled inwardly from substantially the same angle (e.g. screen angle θ) side as the dot growth direction in which the halftone-dot pattern is grown by the first threshold matrix MTX1, when the density of the multilevel image data DMV is larger than the density (transition density) Ccnt to give the maximum number of gaps. The third comparison section 213 outputs such a dot pattern as the binary data Do3 (see FIG. 6(C)).

The first binary arithmetic processing section 251 generates second bitmap data BM2 (=Do2−Do3; second image data) shown in FIG. 6(D) by performing a binary arithmetic processing (logical subtraction process) of "Do2−Do3" between the binary data Do2 output from the second comparison section 212 and the binary data Do3 output from the third comparison section 213. Accordingly, the gap-profile storing section 292 and the second and third comparison sections 212 and 213 function as a second image-data generating section.

The second binary arithmetic processing section 252 generates the binarized recording signal Dout shown in FIG. 6(E) by performing a binary arithmetic processing (logical subtraction process) of "BM1−BM2" between the first bitmap data BM1 output from the first comparison section 211 and the second bitmap data BM2 output from the first binary arithmetic processing section 251. Accordingly, the second binary arithmetic processing section 252 functions as an arithmetic processing section.

Next, the procedure of halftone-dot processing performed by the binarizing section 20 of this exemplary embodiment will be described with reference to FIG. 5. First, the first image-data generating section (the first comparison section 211) acquires multilevel image data DMV of each color component from the color-separation-signal generating section 10 (S101). Then, the first image-data generating section (the first comparison section 211) compares the multilevel image data DMV with the first threshold matrix MTX1 stored in the halftone-dot-profile storing section 291 and generates first bitmap data BM1 shown in FIG. 6(A) (S102).

The second image-data generating section (the second comparison section 212 and the third comparison section 213) acquires the multilevel image data DMV of each color component from the color-separation-signal generating section 10 (S101) and judges whether or not the density of the acquired multilevel image data DMV is equal to or larger than the first density C3 (the density on the low density side at which it is started to form gap) (S103). When the density of the multilevel image data DMV is lower than the first density C3 (No at S103), the second image-data generating section (the second comparison section 212, the third comparison section 213 and the first binary arithmetic processing section 251) generates the second bitmap data BM2 so that all dots of the second bitmap data BM2 are off (that is, all the dots of the second bitmap data BM2 are white dots/non-output dots; see the dot pattern at the top in FIG. 6(D)) (S104).

When the density of the acquired multilevel image data DMV is equal to or larger than the first density C3 (Yes at S103), the second image-data generating section (the second comparison section 212 and the third comparison section 213) judges as to whether or not the density of the multilevel image data DMV is equal to or larger than the transition density Ccnt (the density to give the maximum number of gaps) (S105). When the density of the multilevel image data DMV is equal to or larger than the first density C3 and lower than the transition density Ccnt (No at S105), the second image-data generating section (the second comparison section 212, the third comparison section 213 and the first binary arithmetic processing section 251) generates the second bitmap data BM2 so that some dots are on (that is, some dots are black dots/output dots) in accordance with the density value, which is equal to or larger than the first density C3 (S106; see the dot patterns at the second to fourth positions from the top in FIG. 6(D)).

When the density of the acquired multilevel image data DMV is equal to or larger than the transition density Ccnt (Yes at S105), the second image-data generating section (the second comparison section 212 and the third comparison section 213) judges as to whether or not the density of the multilevel image data DMV is equal to or larger than the second density C4 (the density on the high density side at which it is started to form gap) (S107). When the density is equal to or larger than the transition density Ccnt to turn all dots of the first bitmap data BM1 on (that is, all the dots of the first bitmap data BM1 are black dots/output dots) and lower than the second density C4 (No at S107), the second image-data generating section (the second comparison section 212, the third comparison section 213 and the first binary arithmetic processing section 251) turn on-state pixels (black dots/output dots) of the second bitmap data BM2 off (white dots/non-output dots) successively in accordance with the density of the multilevel image data DMV, which is higher than the transition density Ccnt (S108; see the dot patterns at the fifth and sixth positions from the top in FIG. 6(D)). In this case, the direction of turning the pixels off successively may be the direction of the screen angle θ.

When the density of the multilevel image data DMV is larger than the second density C4, the second image-data generating section (the second comparison section 212, the third comparison section 213 and the first binary arithmetic processing section 251) turns all the dots of the second bitmap data BM2 off (zero→white dots/non-output dots) (S109; see the dot pattern at the bottom in FIG. 6(D)).

According to this processing, in the second bitmap data BM2, which is an output result of the first binary arithmetic processing section 251, black dots increase gradually along the predetermined angle (e.g. screen angle θ) as shown in FIG. 6(D) when the density of the multilevel image data DMV is in the predetermined range (from the first density C3 to the second density C4) of the intermediate density range. After the number of the black dots reaches the maximum value when the density of the multilevel image data DMV takes the transition density Ccnt, the second bitmap data BM2 is generated so that the black dots decrease gradually along the predetermined angle (e.g. screen angle θ). As a result, dots corresponding to the gap (non-output dots) can be changed dynamically in accordance with the density of the multilevel image data DMV by processing performed by the second binary arithmetic processing section 252 following the first binary arithmetic processing section 251.

That is, the second image-data generating section (the second and third comparison sections 212 and 213 and the first binary arithmetic processing section 251) generates the second bitmap data BM2 while non-output dots represented as a set of output dots are set as binarized data, which dynamically corresponds to an intensity (equivalent to the density of the input image) of the multilevel image data DMV in the density range of from the first density C3 to the second density C4.

Particularly, in this exemplary embodiment, while the variable gap-size system is used, the gap is formed in the halftone dot only in the intermediate density range. Accordingly, the number of non-output dots is maximized at the transition density Ccnt where the first bitmap data BM1 are all "1", and the number of non-output dots decreases gradually from the maximum value before and after the transition density Ccnt, that is, in a density range of from the first density C3 to the transition density Ccnt and in a density range of from the transition density Ccnt to the second density C4. In this manner, the number of non-output dots is changed dynamically in accordance with the density of the input image.

Then, the second binary arithmetic processing section 252 generates a binarized recording signal Dout shown in FIG. 6(E) by executing the binary arithmetic processing (logical subtraction process) of "BM1−BM2=Do1−(Do2−Do3)" between the first bitmap data BM1 (=binary data Do1) output from the first image-data generating section (the first comparison section 211) and the second bitmap data BM2 output from the second image-data generating section (the first binary arithmetic processing section 251) (S110).

As shown in FIG. 6(E), the binarized recording signal Dout output from the second binary arithmetic processing section 252 serves as binary data in which gap is provided inside halftone dots when the density of the multilevel image data DMV is in the intermediate density range. That is, the binarizing section 20 converts part of dots inside contour dots into non-output dots on the binarized recording signal Dout, which is electronic data representing the halftone dot.

Incidentally, when the fixed gap-size system is used, the judgment process concerned with the transition density Ccnt in the step 105 of this exemplary embodiment and the process according to the judgment result are not required. That is, when the density of the multilevel image data DMV of each color component, which is input from the color-separation-signal generating section 10, is lower than the first density C1 (see FIG. 3A), all the dots of the second bitmap data BM2 are turned off (white dots/non-output dots). When the density of the multilevel image data DMV is equal to or larger than the first density C1 and lower than the second density C2, the second bitmap data BM2 are generated so that the number of dots corresponding to the gap size b0 are turned on (black dots/output dots). When the density of the multilevel image data DMV is larger than the second density C2, all the dots of the second bitmap data BM2 are turned off (white dots/non-output dots).

Figure 7A:
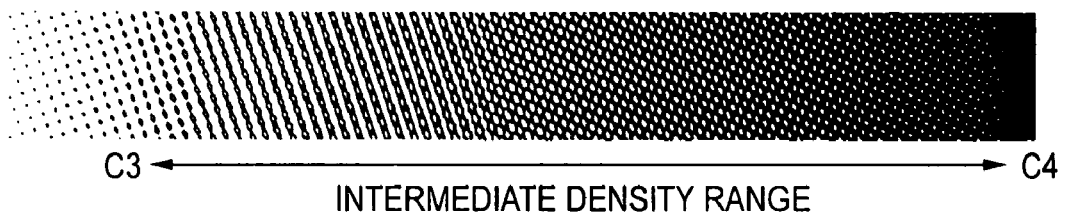
FIGS. 7A and 7B are views showing a halftone-dot image generated by halftone-dot processing in the binarizing section and a halftone-dot image generated by binarizing processing according to the related art.
Figure 7B:
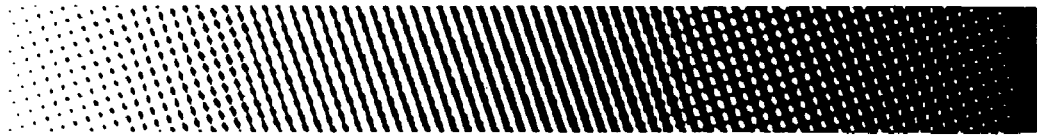

FIG. 7A shows an example of the halftone-dot image generated by halftone-dot processing performed by the binarizing section 20 of this exemplary embodiment. FIG. 7B shows an example of the halftone-dot image generated by the binarizing process according to the related art.

Second Exemplary Embodiment

The first embodiment has shown the case where a halftone is reproduced by each halftone dot, which is shaped so as to extend along the predetermined angle (e.g. screen angle θ) and contains gap (white dots) having the same shape as the contour of the halftone dot inside the halftone dot while the contour shape of the halftone dot is kept. The second exemplary embodiment shows the case where a halftone is reproduced by a halftone dot in which dots formed by recording energy lower than the recording energy used for forming the contour dots are arranged instead of the gap (white dots). Incidentally, the detailed description of the same configuration as that of the first embodiment will be omitted.

Figure 8:
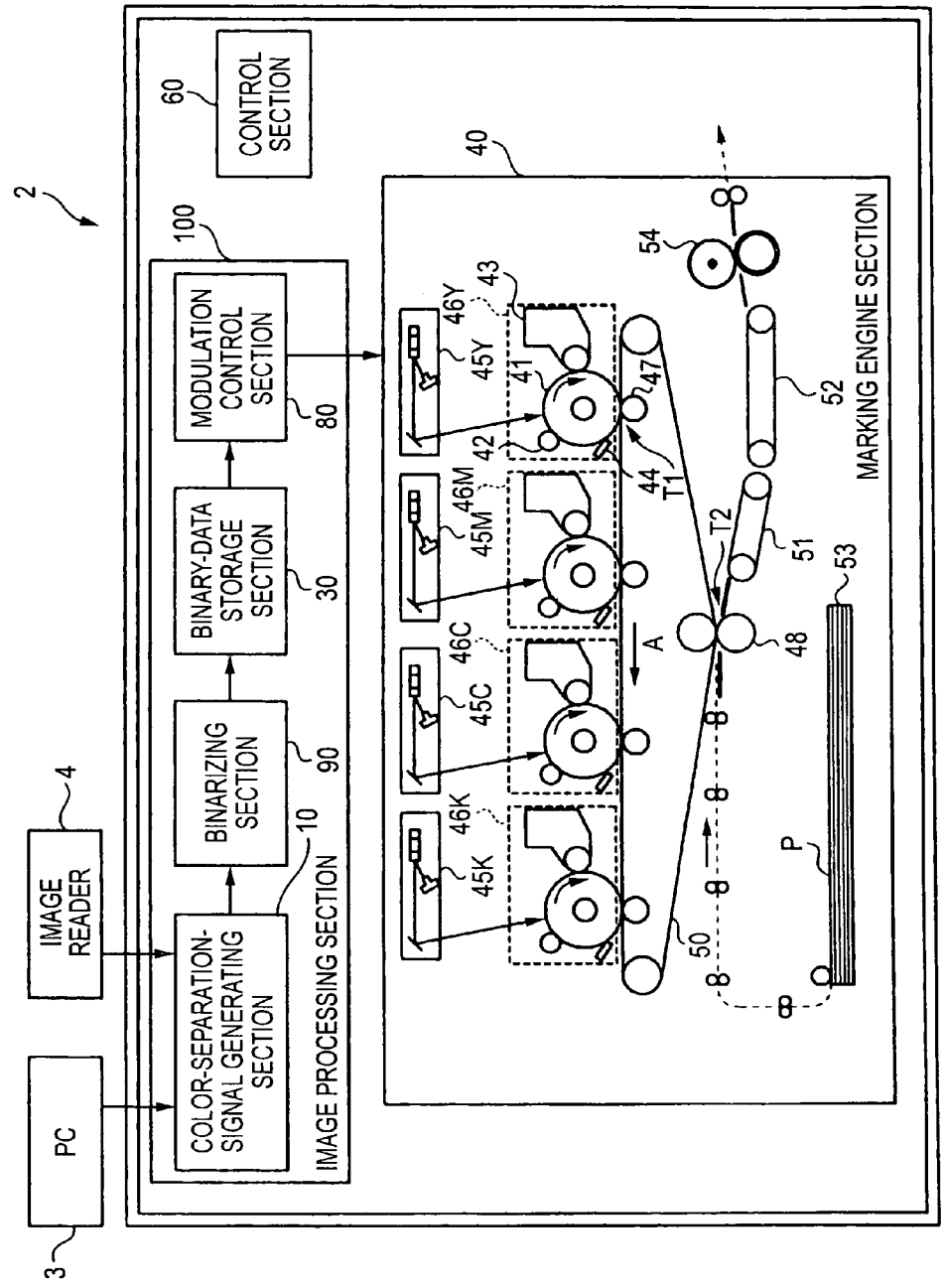
FIG. 8 is a diagram showing an overall configuration of an image forming apparatus according to a second exemplary embodiment.

FIG. 8 is a diagram showing the overall configuration of an image forming apparatus 2 to which the second exemplary embodiment is applied. The image forming apparatus 2 shown in FIG. 8 is structurally different from the image forming apparatus 1 according to the first embodiment shown in FIG. 4 in the configuration of a binarizing section 90 of the image processing section 100 and a modulation control section 80, which is arranged posterior to the binary-data storage section 30.

Figure 9:
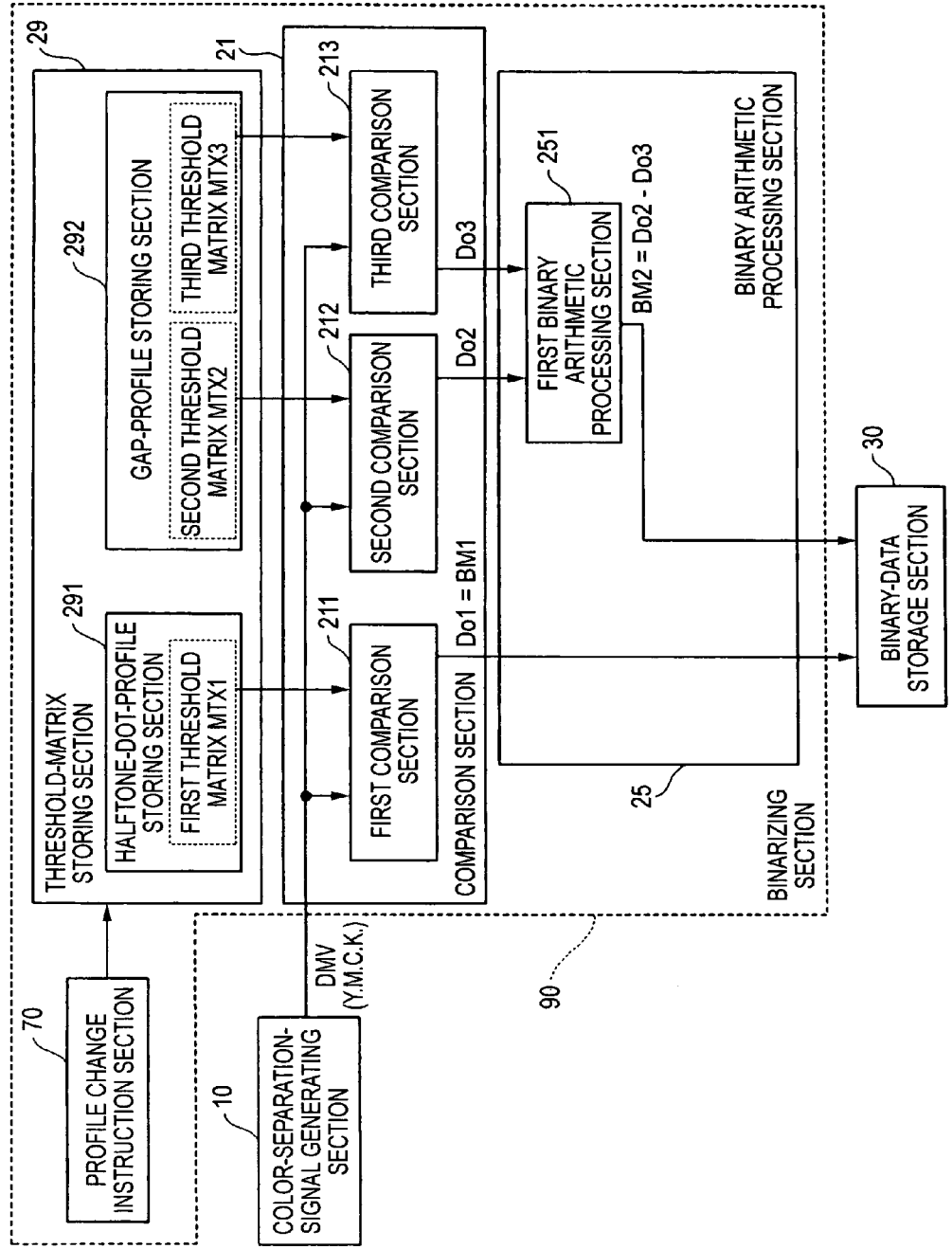
FIG. 9 is a block diagram showing the configuration of a binarizing section.

FIG. 9 is a block diagram showing the configuration of the binarizing section 90 of this exemplary embodiment. As shown in FIG. 9, the binarizing section 90 of this exemplary embodiment is structurally different from the binarizing section 20 in the first embodiment in that the second binary arithmetic processing section 252 is not provided. For this reason, in the binarizing section 90 of this exemplary embodiment, the binary data Do1 generated by the first comparison section 211, that is, the first bitmap data BM1 and the second bitmap data BM2 (=Do2−Do3) generated by the first binary arithmetic processing section 251 are output as they are. The first and second bitmap data BM1 and BM2 thus output are stored in the binary-data storage section 30.

The modulation control section 80 of this exemplary embodiment generates an output modulation signal DEX for controlling the ON/OFF state and output value (laser intensity) of laser light emitted from the laser exposure devices 45Y, 45M, 45C and 45K of the marking engine section 40 on the basis of the first and second bitmap data BM1 and BM2 stored in the binary-data storage section 30.

Figure 10:
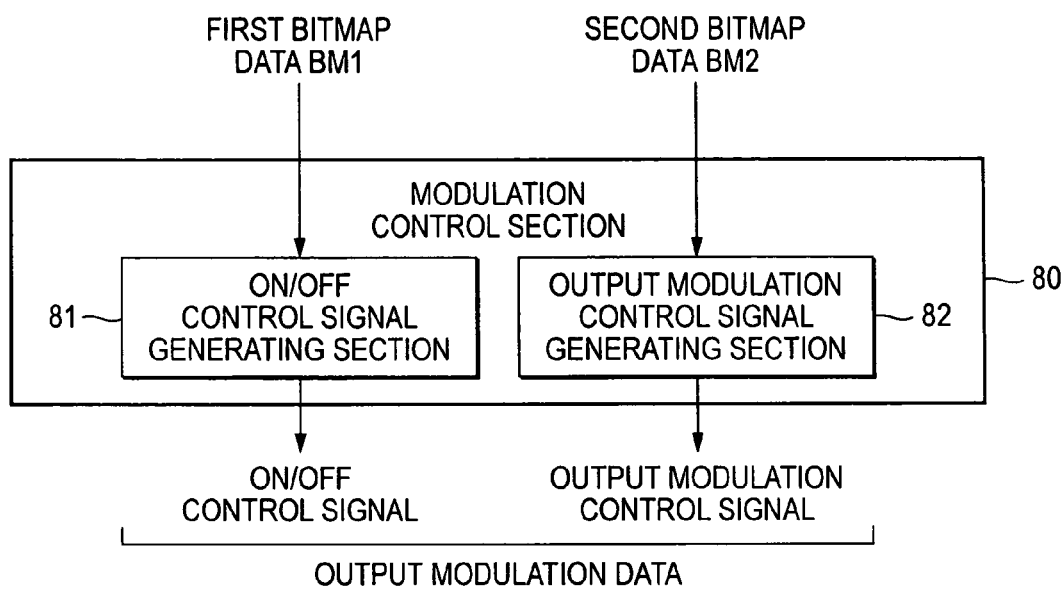
FIG. 10 is a block diagram showing the configuration of a modulation control section.

FIG. 10 is a block diagram showing the configuration of the modulation control section 80 of this exemplary embodiment. As shown in FIG. 10, the modulation control section 80 includes an ON/OFF control signal generating section 81 and an output modulation control signal generating section 82. The ON/OFF control signal generating section 81 generates a laser light ON/OFF control signal from the first bitmap data BM1. The output modulation control signal generating section 82 generates an output modulation control signal for modulating the laser intensity from the second bitmap data BM2. That is, the output modulation signal DEX contains the laser light ON/OFF control signal and the output modulation control signal.

Incidentally, when an ink-jet system is used in the marking engine section 40, the output modulation signal DEX is used as an ink amount control signal for controlling the amount of ink droplet to be ejected.

Next, the binarizing process (halftone-dot processing) performed by the image processing section 100 of this exemplary embodiment will be described.

Figure 11:
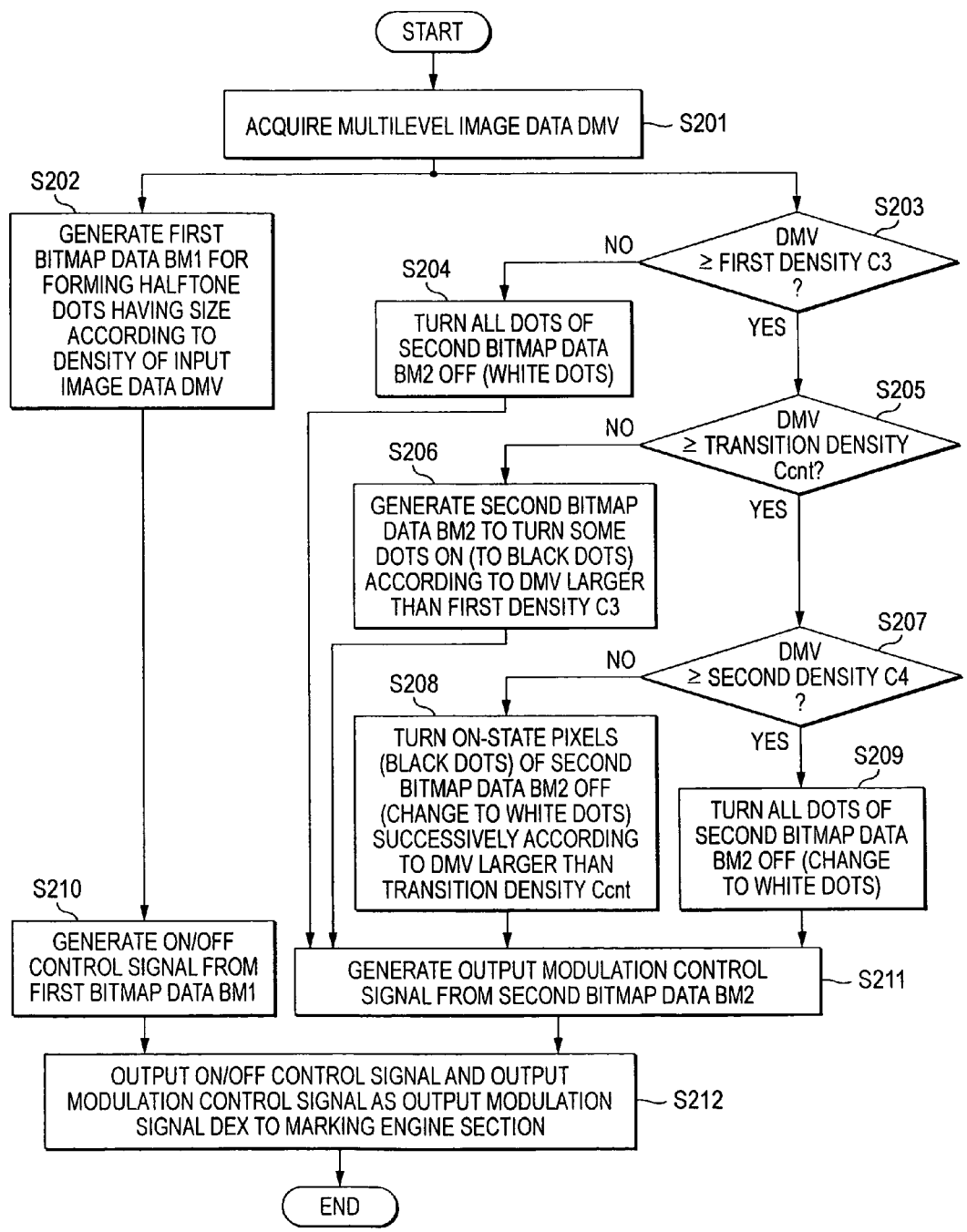
FIG. 11 is a flow chart showing the outline of a procedure of halftone-dot processing in an image processing section.

FIG. 11 is a flow chart showing the outline of a procedure of halftone-dot processing performed by the image processing section 100 of this exemplary embodiment. FIGS. 12(A) to 12(D) are views showing processes of generation of ring-like halftone dots by halftone-dot processing performed by the image processing section 100 of this exemplary embodiment. FIG. 12(A) shows an example of the binary data Do1 output from the first comparison section 211 of the binarizing section 90, that is, an example of the first bitmap data BM1. FIG. 12(B) shows an example of the binary data Do2 output from the second comparison section 212 of the binarizing section 90. FIG. 12(C) shows an example of the binary data Do3 output from the third comparison section 213 of the binarizing section 90. FIG. 12(D) shows an example of the second bitmap data BM2 output from the first binary arithmetic processing section 251.

First, the first comparison section 211 acquires multilevel image data DMV of each color component from the color-separation-signal generating section 10 (S201). Then, the first comparison section 211 compares the multilevel image data DMV with the first threshold matrix MTX1 stored in the halftone-dot-profile storing section 291 and generates first bitmap data BM1 shown in FIG. 12(A) (S202).

After the generated first bitmap data BM1 is once stored in the binary-data storage section 30, the first bitmap data BM1 is output to the ON/OFF control signal generating section 81 of the modulation control section 80. The ON/OFF control signal generating section 81 generates an ON/OFF control signal for controlling the ON/OFF state of laser light from the first bitmap data BM1 (S210).

In the second and third comparison sections 212 and 213 and the first binary arithmetic processing section 251, second bitmap data BM2 is generated in accordance with the same procedure (S201 to S209) as that in the first embodiment so that halftone dots corresponding to gap having a size according to the density of the acquired multilevel image data DMV are formed.

After the second bitmap data BM2 thus generated is once stored in the binary-data storage section 30, the second bitmap data BM2 is output to the output modulation control signal generating section 82 of the modulation control section 80. The output modulation control signal generating section 82 generates an output modulation control signal for modulating the laser intensity from the second bitmap data BM2 (S211).

Further, the modulation control section 80 outputs the ON/OFF control signal and the output modulation control signal as an output modulation signal DEX to the marking engine section 40 (S212).

On this occasion, in the pixel dot position hatched in the first bitmap data BM1 shown in FIG. 12(A), the ON/OFF control signal generated in the step 210 serves as a signal ("1") for turning the laser on. In the pixel dot position painted with white in the first bitmap data BM1 shown in FIG. 12(A), the ON/OFF control signal serves as a signal ("0") for turning the laser off. The laser exposure devices 45Y, 45M, 45C and 45K of the marking engine section 40 turn the laser on/off based on the ON/OFF control signal.

In the pixel dot position painted with white in the second bitmap data BM2 shown in FIG. 12(D), the output modulation control signal generated in the step 211 serves as a signal ("0") for setting the output intensity of the laser to 100%. In the pixel dot position hatched in the second bitmap data BM2 shown in FIG. 12(D), for example, the output modulation control signal serves as a signal ("1") for setting the output intensity of the laser to 50%. The laser exposure devices 45Y, 45M, 45C and 45K of the marking engine section 40 controls the output intensity of the laser based on the output modulation control signal.

In this manner, dots at the second bitmap data BM2 (=output modulation control signal) of "1" can be substantially formed as non-output dots because exposure is made with low laser output intensity. Incidentally, a "hollow structure" in the halftone dot is formed from the true non-output dots without output of the laser in the first embodiment and the substantial non-output dots in this exemplary embodiment.

Because the second bitmap data BM2 (=output modulation control signal) can be calculated by the same process as the binarizing process in the first embodiment, a halftone-dot pattern having gap inside halftone dots in the intermediate density range as shown in FIG. 6(E) in the first embodiment can be obtained as a result if exposure is made only when the first bitmap data BM1 (=ON/OFF control signal) is on.

In addition, the halftone dot to be formed in the image processing section 100 of this exemplary embodiment is shaped so as to be extended along the screen angle θ. That is, threshold matrices to form a halftone dot so that contour dots (output dots) in the halftone dot and white dots (non-output dots) for forming gap are extended along a predetermined angle such as a screen angle θ as shown in FIG. 2 are set in the first threshold matrix MTX1 stored in the halftone-dot-profile storing section 291 of the binarizing section 90 and the second and third threshold matrices MTX2 and MTX3 stored in the gap-profile storing section 292. For this reason, also in the image processing section 100 of this exemplary embodiment, such a line screen that halftone dots are connected linearly in the direction of a predetermined angle (screen angle θ) is formed particularly in an intermediate density range.

Figure 12:
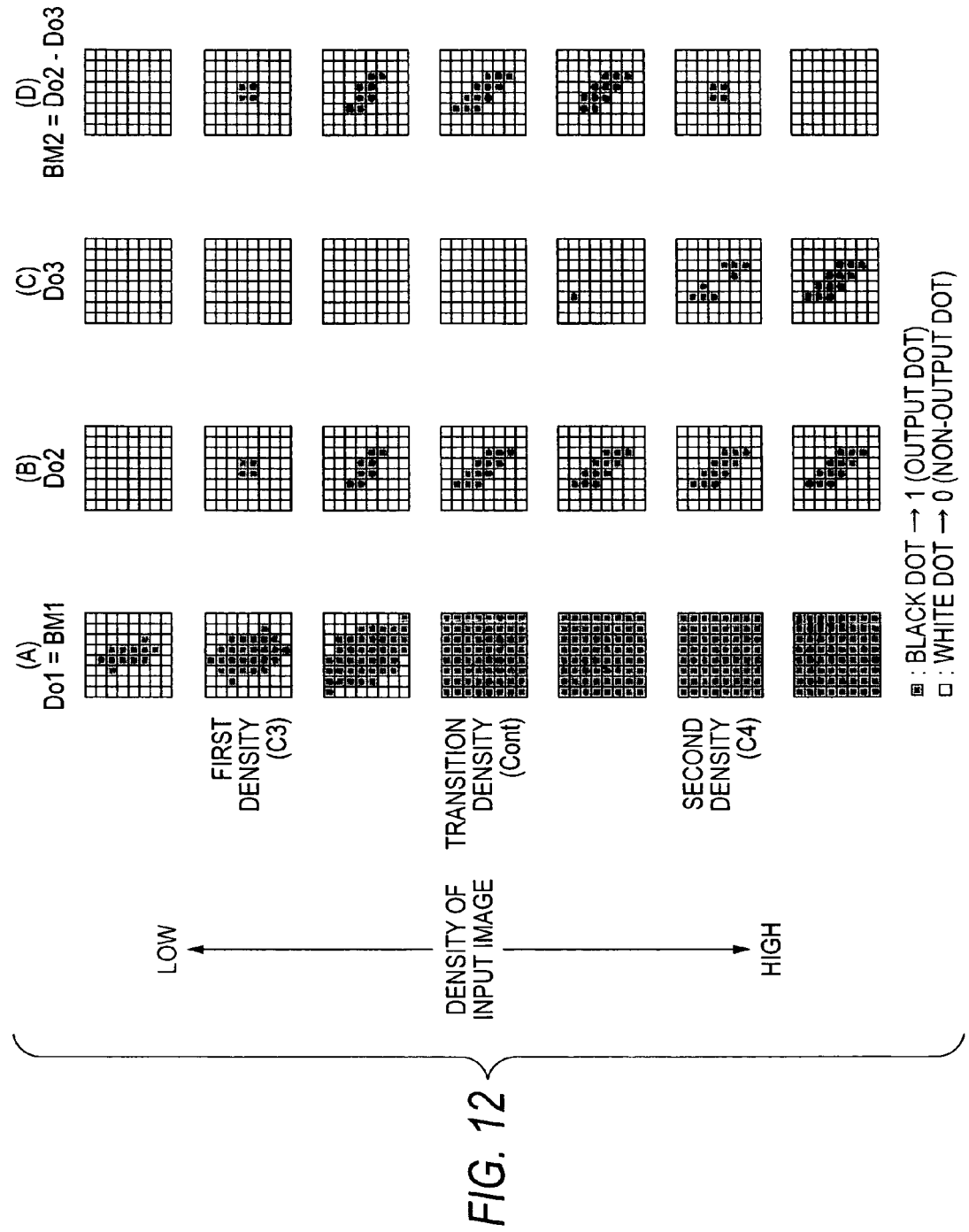
FIG. 12 is a view showing processes of production of ring-like halftone dots by halftone-dot processing in the image processing section.
Figure 13A:
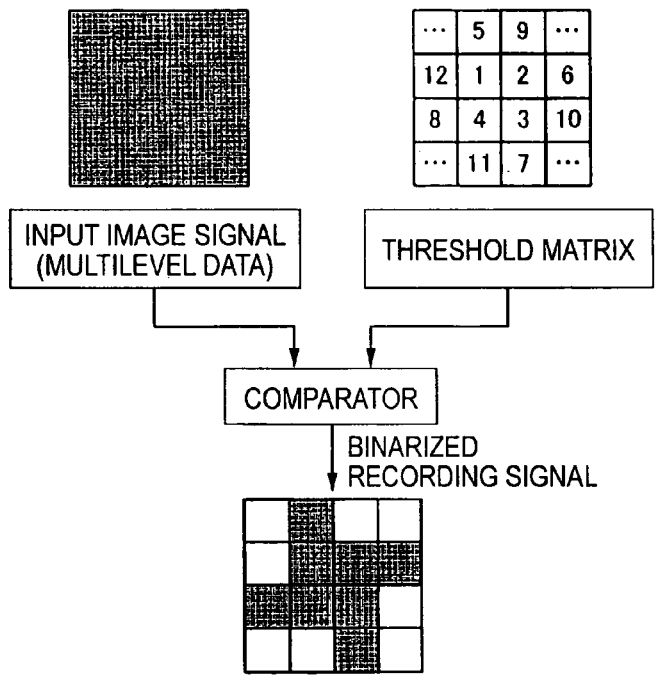
FIG. 13A is a view schematically showing an example of binarizing processing according to the related art.
Figure 13B:
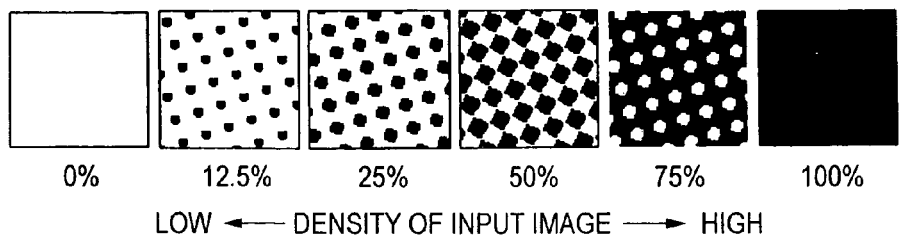
FIG. 13B is a view showing an example of halftone dots generated by the binarizing processing.

In the image processing section 100 of this exemplary embodiment, the laser output (exposure) can be controlled when the second bitmap data BM2 (=output modulation control signal) is "1 (hatched dot portion in FIG. 12 (D))". Accordingly, there is an advantage in that the density of the gap can be adjusted freely though it is necessary to provide the modulation control section 80. By this advantage, when the coloring agent in the halftone dot is formed as a thin layer, the degree of reduction in layer thickness can be adjusted without any change of the number of pixels to be thinned inside the halftone dot.

Incidentally, in Embodiments 1 and 2, when a dot pattern representing gap shown in FIG. 6(D) or FIG. 12(D) is generated, the second thresholds matrix MTX2 for chiefly defining the gap size on the low density side and the third threshold matrix MTX3 for chiefly defining the gap size on the high density side are prepared so that the second and third threshold matrices MTX2 and MT3 are synthesized to define the gap size on the whole of the intermediate density range of the multilevel image data DMV.

However, the invention is not limited thereto. For example, gap threshold matrices (e.g. two thresholds on the low density side and the high density side are set in one coordinate) for giving a halftone-dot pattern shown in FIG. 6(D) or FIG. 12(D) can be prepared in the gap-profile storing section 292 so that the gap size on the whole of the intermediate density range of the multilevel image data DMV can be defined. Further, the gap threshold matrices may be used so that a binarizing process is executed by the first binary arithmetic processing section 251. By this configuration, the number of threshold matrices to be used can be reduced, so that reduction in cost of the apparatus can be attained.

The halftone-dot processing described in Embodiments 1 and 2 is not only formed from a hardware processing circuit but also can be achieved in the form of software by use of a computer based on a program code for achieving the function of halftone-dot processing.

In this case, such halftone-dot processing can be achieved when a program for executing such halftone-dot processing is installed in an exclusive hardware-embedded computer (such as an embedded micro-computer, etc.), an SOC (System On a Chip) having functions of a CPU (Central Processing Unit), a logical circuit, a storage device, etc. mounted on a chip to achieve a desired system, or a general-purpose personal computer capable of executing various functions when various programs are installed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an input section that inputs multilevel image data; and
a binarizing section that binarizes multilevel image data to generate output image data representing halftone dots each having a hollow-structure, the binarizing section that enlarges the halftone dots in a predetermined direction preferentially in accordance with the input multilevel image data, wherein:
the binarizing section generates the output image data so that:
a hollow portion formed inside the halftone-dot pattern is enlarged until a value of the multilevel image data reaches a predetermined range, and
that the hollow portion is reduced when the value of the multilevel image data exceeds the predetermined range.

2. The apparatus according to claim 1, wherein the binarizing section makes the halftone dots larger preferentially in the predetermined direction as a density of the input multilevel image data gets larger.

3. The apparatus according to claim 1, wherein the binarizing section generates the output image data, which represents the halftone-dot pattern having a substantially linear structure when a value of the multilevel image data is in a predetermined range.

4. The apparatus according to claim 1, wherein:
the input section inputs the plural pieces of multilevel image data of a plurality of color components,
the binarizing section generates the plural pieces of output image data,
each of the output image data represents the hollow-structure halftone-dot pattern, which is enlarged preferentially in the direction of the predetermined angle, and
the predetermined angles of the respective color components are different from each other.

5. The apparatus according to claim 1, wherein the binarizing section comprises:
a first image-data generating section that generates first image data representing a set of pixel dots, which are enlarged preferentially in the direction of the predetermined angle in accordance with a value of the multilevel image data input from the input section;
a second image-data generating section that generates second image data representing a set of non-pixel dots located inside the set of pixel dots represented by the first image data, the set of non-pixel dots being enlarged or reduced preferentially in the direction of the predetermined angle in accordance with the value of the multilevel image data input from the input section; and
an arithmetic processing section that generates the output image data based on the first image data generated by the first image-data generating section and the second image data generated by the second image-data generating section.

6. The apparatus according to claim 5, wherein the second image-data generating section generates the second image data when the value of the multilevel image data input from the input section is equal to or larger than a predetermined value.

7. The apparatus according to claim 5, wherein the second image-data generating section generates the second image data so that the set of non-pixel dots does not overlap a contour portion of the set of pixel dots.

8. The apparatus according to claim 1, wherein the binarizing section enlarges each halftone dot in accordance with the input multilevel image data so that an angle between a line having a screen angle and an average of vectors, which connect a center of the halftone dot and a contour point of the halftone dot farthest from the center, is in a predetermined range.

9. An image processing method for binarizing multilevel image data to generate output image data, which is used to reproduce halftones in a pseudo manner, the method comprising:
inputting multilevel image data;
generating the output image data representing a hollow-structure halftone-dot pattern, which is enlarged preferentially in a direction of a predetermined angle in accordance with the multilevel image data input from the input section;
outputting the generated output image data; and
wherein the output image data is generated so that a hollow portion formed inside the halftone-dot pattern is enlarged until a value of the multilevel image data reaches a predetermined range, and that the hollow portion is reduced when the value of the multilevel image data exceeds the predetermined range.

10. The method according to claim 9, wherein the generating of the output image data comprises:
generating first image data representing a set of pixel dots, which are enlarged preferentially in the direction of the predetermined angle in accordance with a value of the input multilevel image data;
generating second image data representing a set of non-pixel dots located inside the set of pixel dots represented by the first image data, the set of non-pixel dots being enlarged or reduced preferentially in the direction of the predetermined angle in accordance with the value of the input multilevel image data; and generating the output image data based on the generated first image data and the generated second image data.

11. An image forming apparatus comprising:

an input section that inputs multilevel image data;

a binarizing section that binarizes the multilevel image data to generate output image data representing halftone dots each having a hollow-structure, the binarizing section that enlarges the halftone dots in a predetermined direction preferentially in accordance with the input multilevel image data;

an image forming section that forms a halftone image based on the output image data generated by the binarizing section; and wherein the output image data is generated so that a hollow portion formed inside the halftone-dot pattern is enlarged until a value of the multilevel image data reaches a predetermined range, and that the hollow portion is reduced when the value of the multilevel image data exceeds the predetermined range.

12. The apparatus according to claim 11, wherein the binarizing section generates the output image data, which represents the halftone-dot pattern having a substantially linear structure when a value of the multilevel image data is in a predetermined range.

13. The apparatus according to claim 12, wherein:

the input section inputs the plural pieces of multilevel image data of a plurality of color components, the binarizing section generates the plural pieces of output image data, each of the output image data represents the hollow-structure halftone-dot pattern, which is enlarged preferentially in the direction of the predetermined angle, and the predetermined angles of the respective color components are different from each other.

14. The apparatus according to claim 11, wherein the binarizing section comprises:

a first image-data generating section that generates first image data representing a set of pixel dots, which are enlarged preferentially in the direction of the predetermined angle in accordance with a value of the multilevel image data input from the input section;

a second image-data generating section that generates second image data representing a set of non-pixel dots located inside the set of pixel dots represented by the first image data, the set of non-pixel dots being enlarged or reduced preferentially in the direction of the predetermined angle in accordance with the value of the multilevel image data input from the input section; and an arithmetic processing section that generates the output image data based on the first image data generated by the first image-data generating section and the second image data generated by the second image-data generating section.

15. The apparatus according to claim 14, wherein:

the image forming section applies a coloring agent to a recording medium to form the halftone image, and the image forming section controls an amount of the applied coloring agent based on the second image data generated by the second image-data generating section.

16. The apparatus according to claim 14, wherein:

the image forming section applies a coloring agent to a recording medium to form the halftone image, and the image forming section prohibits the coloring agent from being applied based on the second image data generated by the second image-data generating section.

* * * * *